United States Patent [19]
Childress et al.

[11] Patent Number: 4,658,435
[45] Date of Patent: Apr. 14, 1987

[54] RADIO TRUNKING SYSTEM WITH TRANSCEIVERS AND REPEATERS USING SPECIAL CHANNEL ACQUISITION PROTOCOL

[75] Inventors: Jeffrey S. Childress, Lynchburg; Mark M. Sihlanick; Michael W. Smith, both of Forest; Peyton L. Morgan, III, Lynchburg, all of Va.

[73] Assignee: General Electric Company, Lynchburg, Va.

[21] Appl. No.: 721,815

[22] Filed: Apr. 10, 1985

Related U.S. Application Data

[63] Continuation-in-part of Ser. No. 645,710, Sep. 17, 1984, abandoned.

[51] Int. Cl.$^4$ .......................... H04B 1/40; H04B 7/15
[52] U.S. Cl. .......................... 455/17; 455/34; 455/54; 455/77; 370/95
[58] Field of Search .......................... 455/7–9, 455/17, 31–34, 54, 56, 77; 179/2 EB; 370/24, 26, 29, 95

[56] References Cited

U.S. PATENT DOCUMENTS

| | | | |
|---|---|---|---|
| 3,634,627 | 1/1972 | Velentini | 455/34 |
| 4,347,625 | 8/1982 | Williams | 455/33 |
| 4,360,927 | 11/1982 | Bowen et al. | 455/17 |
| 4,395,594 | 7/1983 | Meyerle | 455/34 |
| 4,414,661 | 11/1983 | Karlstrom | 455/56 |
| 4,534,061 | 8/1985 | Ulug | 455/34 |
| 4,553,262 | 11/1985 | Coe | 455/17 |
| 4,573,207 | 2/1986 | Smith et al. | 455/17 |

Primary Examiner—Jin F. Ng
Attorney, Agent, or Firm—Nixon & Vanderhye

[57] ABSTRACT

An arrangement for establishing communication between a first mobile radio transceiver and a second mobile radio transceiver through a repeater over a radio frequency channel selected from a plurality of such channels. A repeater distinguishes between two-tone signalling sequences and four-tone signalling sequences by determining the arrival rate over some predefined interval of a received signalling sequence. The repeater transmits a busy signal to alert mobile stations seeking to acquire a channel that the repeater is busy. The repeater interrupts the transmitted busy signal during a portion of the four-tone signalling sequence but not the two-tone signalling sequence to help prevent two-tone mobile stations from falsing on four-tone signalling sequences. The arrangement is thus made compatible with both two-tone signalling and four-tone signalling formats. A calling mobile transceiver may specify the length of signalling transmitted by the repeater, so that the mobile transceiver can cause the repeater to transmit signalling for a duration longer than the mobile transceiver itself would require.

39 Claims, 20 Drawing Figures

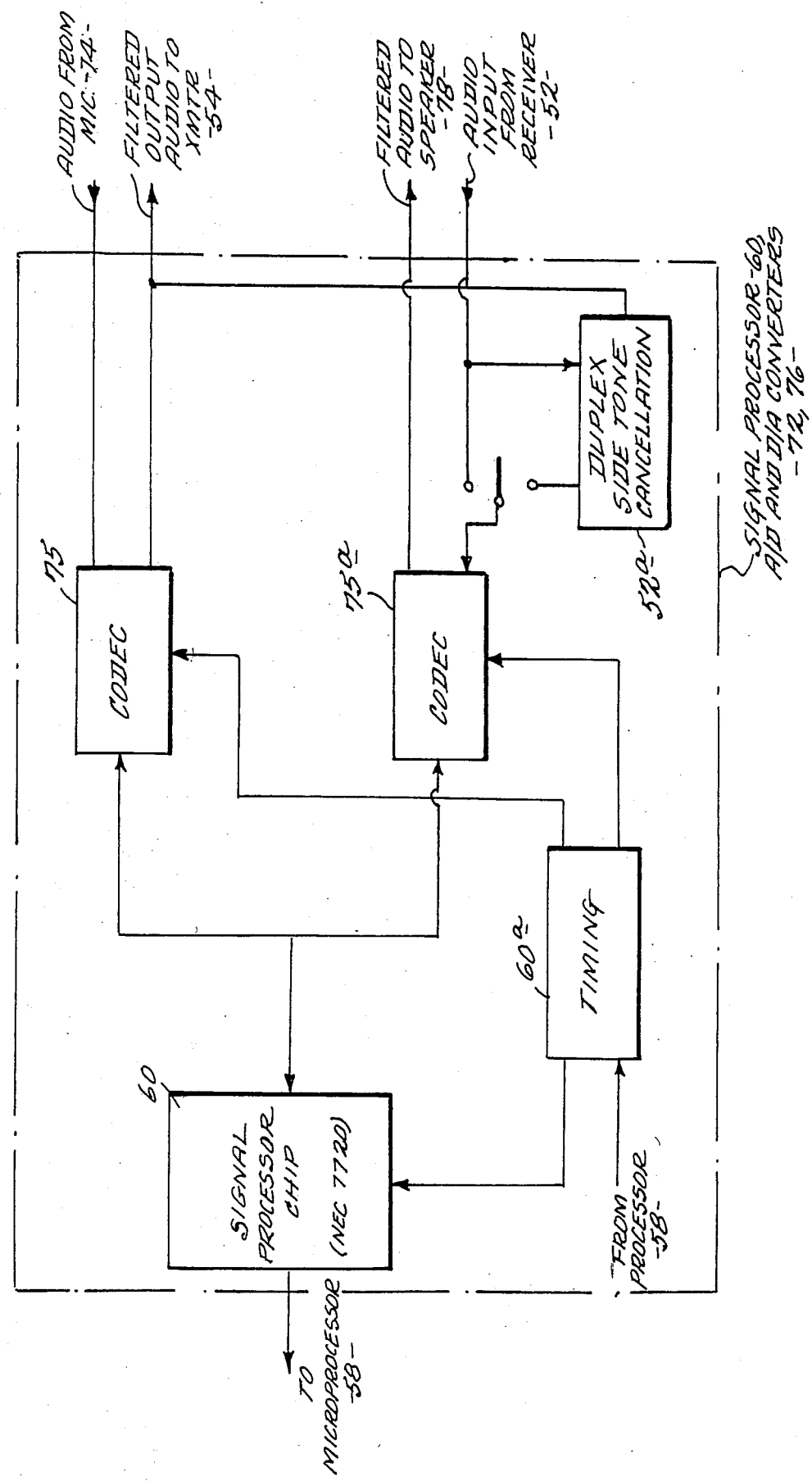

TRANSCEIVER IDLE

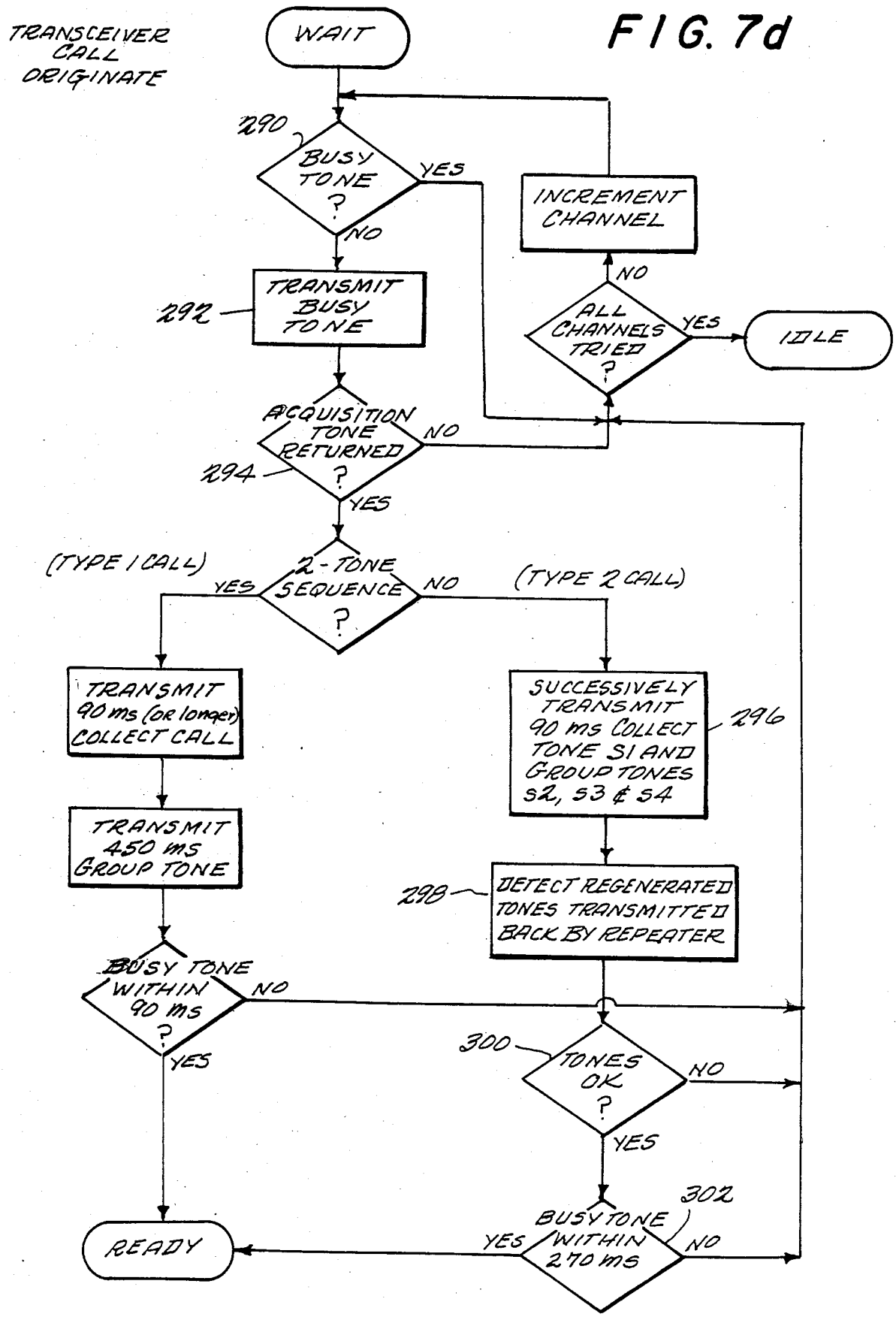

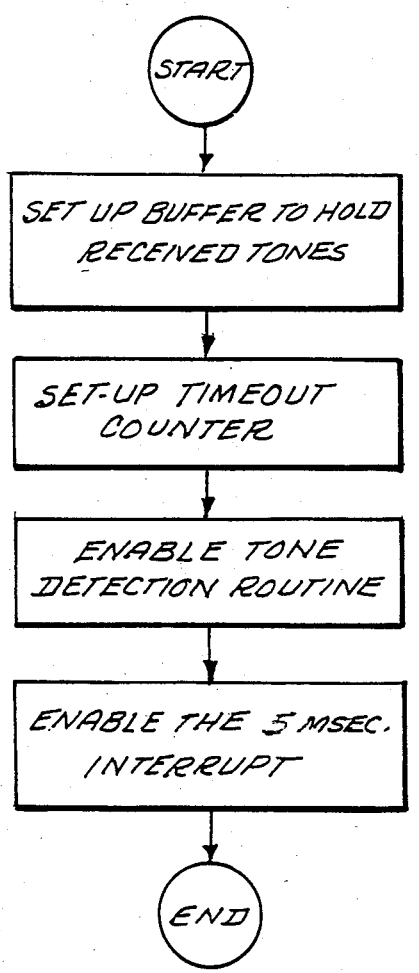
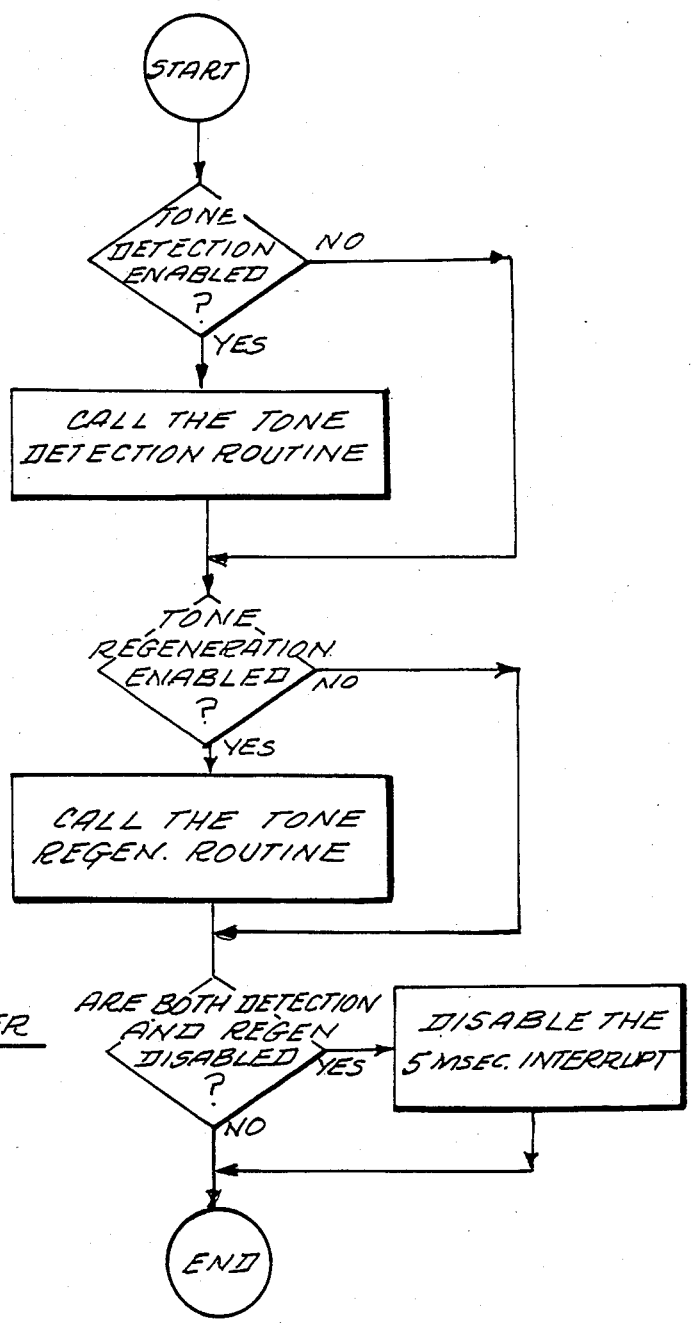
FIG. 8a
CALL INITIATION SET-UP ROUTINE
FIG. 8b
5 MSEC. INTERRUPT HANDLER

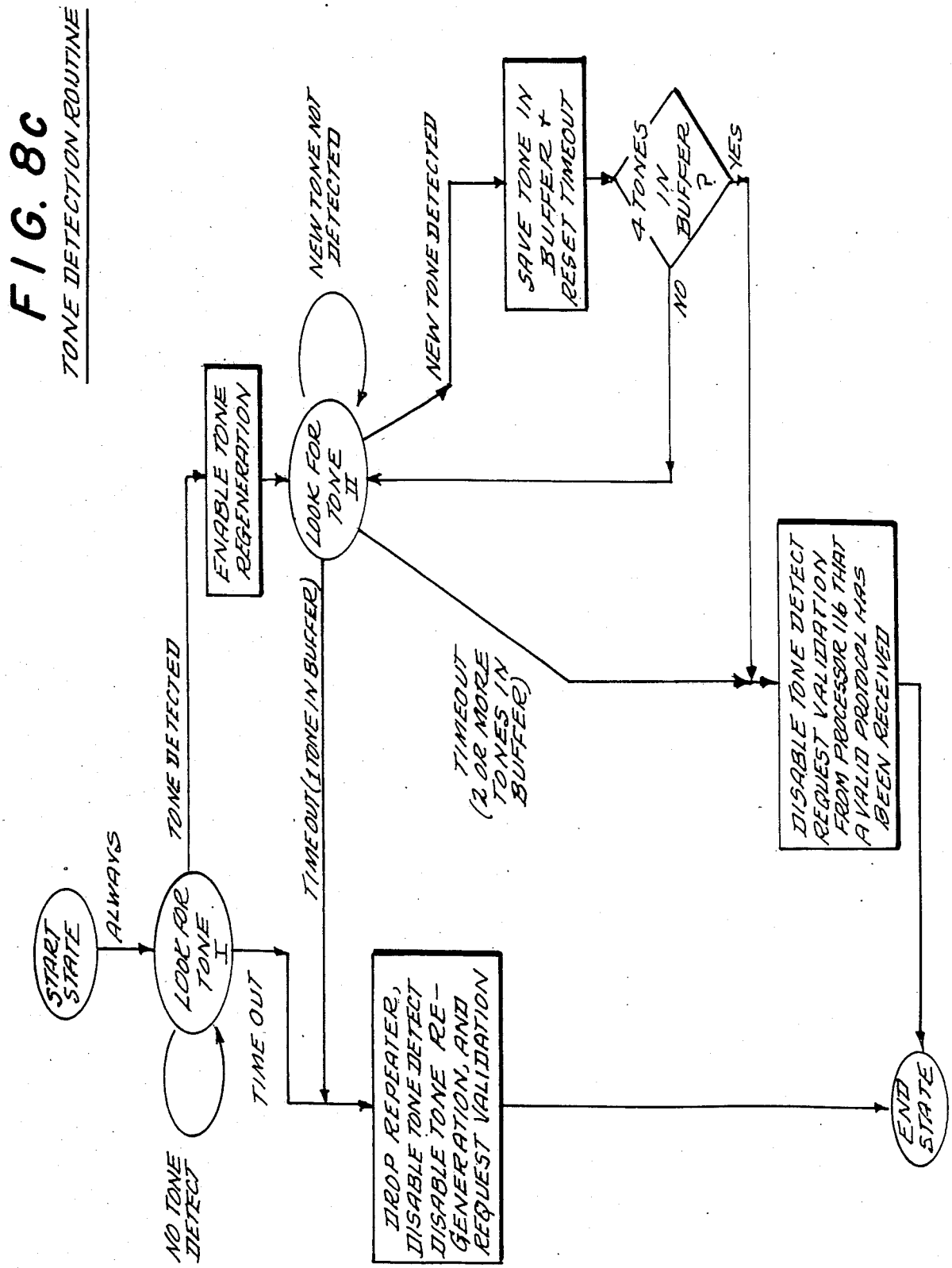

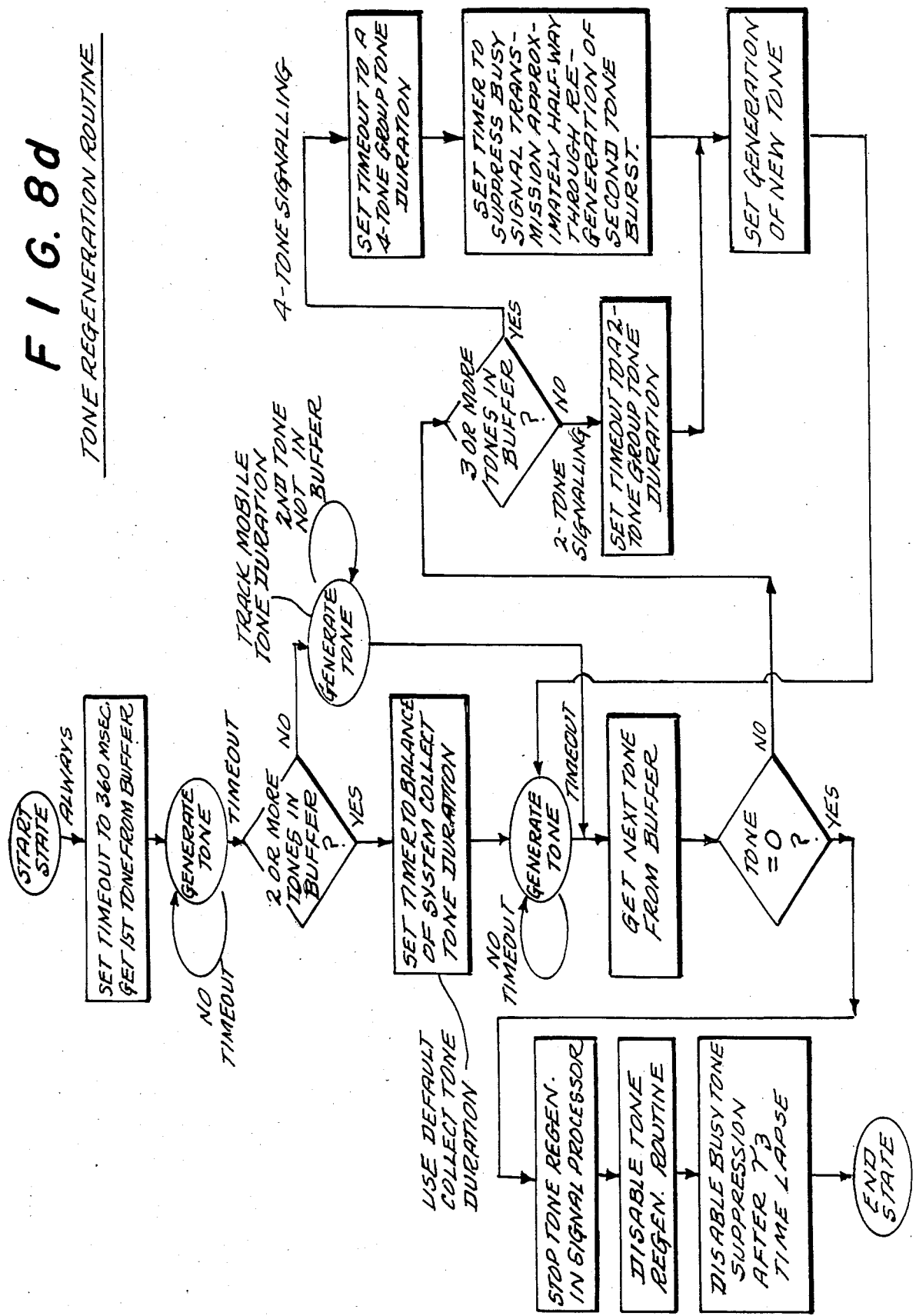

RADIO TRUNKING SYSTEM WITH TRANSCEIVERS AND REPEATERS USING SPECIAL CHANNEL ACQUISITION PROTOCOL

CROSS REFERENCES TO RELATED APPLICATIONS

This application is a continuation-in-part of our commonly assigned copending application Ser. No. 645,710 filed Sept. 17, 1984, now abandoned.

FIELD OF THE INVENTION

This invention relates generally to trunked radio repeater systems. An improved trunking radio transceiver and repeater are involved as is a system employing plural such improved transcievers and repeaters. The system may also be compatible with trunking transceivers of an earlier type (which may even exhibit some improved performance merely because used within such a system).

More specifically, this invention pertains to radio communication systems wherein a plurality of mobile or portable transceivers communicate with one another over several communication channels through radio repeaters operating on each of such channels. This invention is directed to channel acquisition protocol arrangements for establishing communication between a first radio transceiver and a second radio transceiver through a repeater and over a particular radio channel selected and dedicated to that purpose from among a plurality of such channels.

BACKGROUND OF THE INVENTION

In many localities, a plurality of land mobile radio frequency channels are allocated for communication among mobile radio transceivers. Generally, there may be, and usually are, many more mobile radio transceivers than there are available radio channels in a given locality. Each of these radio channels usually includes at least two separate and distinct frequencies, one for transmitting and the other for receiving.

Consequently, some arrangement is needed for enabling a mobile radio transceiver user to obtain access to a radio channel that is not in use (without disturbing the privacy of channels already in use) and to thereafter establish communication with one or more other specifically designated mobile transceivers over that acquired radio frequency channel.

One such arrangement for establishing communication between a first mobile radio station and a second mobile radio station through a repeater over a radio frequency channel selected from a plurality of such channels is disclosed in commonly-assigned U.S. Pat. No. 4,360,927 to Bowen et al (issued Nov. 23, 1982). The disclosure of U.S. Pat. No. 4,360,927 is expressly incorporated herein by reference.

Bowen et al discloses a positive handshake between a mobile station originating a call and a repeater operating on a vacant channel. The operation of the arrangement disclosed by Bowen et al can be explained in connection with FIG. 1 of the present application (which is a graphical illustration of the channel acquisition protocol used in the prior art Bowen et al system).

As depicted in FIG. 1, a mobile station desirous of originating a transmission searches a plurality of channels for an idle channel (indicated by the absence of a busy signal or tone). When the mobile station locates an idle channel, it transmits a busy signal burst which is received by the repeater operating on the idle channel. The repeater, upon detecting the busy signal burst transmitted by the mobile station, transmits an acquisition signal burst which preferably has different characteristics from the busy signal. The acquisition signal burst is transmitted only if the channel is in fact vacant.

The Bowen et al type mobile station (as depicted in FIG. 1) originating the transmission listens for the acquisition signal, and will complete the channel acquisition signalling sequence only after detecting the acquisition signal burst returned from the repeater. If detected, the mobile station then completes the channel acquisition protocol by transmitting a first tone followed by a second tone (i.e. a "group signal" or "collect" tone followed by a "sub-group signal") which collectively identify a particular one or ones of a plurality of mobile transceivers with which the user would like to communicate.

The repeater in the FIG. 1 system receives and retransmits the called station identifying tones to alert other designated mobile stations (which if in an "idle" mode are continuously scanning the channels to detect a preassigned calling signal sequence) identified by the transmitted signalling sequence that communication is to be established. The repeater simultaneously transmits a busy signal throughout the channel acquisition signalling sequence (beginning at the time that a busy signal transmitted by the mobile station is received by the repeater) to ensure that other mobile stations searching for an idle channel detect that the channel is being used.

When the mobile station of FIG. 1 has completed transmission of the desired called signal sequence, it switches back to a receive mode to listen for a busy signal still being transmitted by the repeater. If such a signal is still present, the mobile station typically assumes that the communication channel has been successfully acquired and dedicated to its use, and so alerts a user by then switching into a "ready" mode. The user may then utilize a microphone to transceive voice information over the acquired communications channel via the repeater to other mobile transceivers which have been alerted by the calling signal sequence. On the other hand, if the mobile transceiver does not hear a busy signal at the conclusion of its calling signal transmission, it resumes scanning of the communication channels until another idle channel is found, and attempts to acquire this idle channel.

Although quite successful in its own right, the exemplary arrangement disclosed by Bowen et al can be further improved in at least two ways. (It should be noted throughout that the discussion herein of the Bowen et al type system refers only to the exemplary embodiment disclosed in the Bowen et al patent and does not relate to the scope of any patent claims in the Bowen et al patent.) First, a mobile transceiver in the Bowen et al system can "false" on voice information present on a scanned communication channel (i.e. it can mistake voice information for signalling information and mistakenly determine that it has been called). This effect sometimes has been observed in the field and is believed to be caused by a mobile station detecting, as channel acquisition signalling tones, certain spectral components sequentially present in voice transmissions. Falsing on voice information is particularly prone to occur when two pre-assigned signalling tones are relatively close to one another in frequency, but may occur for any assigned pairs of identifying tones. Such falsing is not merely a nuisance (since it causes a mobile station to alert a user that a call has come in and begins receiving and producing audio of the voice transmission which caused the falsing), but also degrades the security of the entire system. Ways of eliminating voice falsing (such as by transmitting signalling information on frequencies outside the voice band) are known but are complex and expensive.

Another possible problem with a two-tone Bowen et al type system is the relatively small number of different groups of mobile stations which can be served by a single group of repeaters due to the limited number of signalling tones used. The signalling (group identifying) tones used in the Bowen et al system are changed in frequency to select different sets or groups of mobile stations (or even a single station). It has been found that such different frequencies must be relatively well separated from one another in the frequency domain to insure reliable detection and discrimination between tones (e.g. if relatively inexpensive filters and other active signal processing devices which are small enough to be included in a mobile radio transceiver are to be used). To provide adequate frequency separation between different signalling tones, the maximum number of different unique tones is limited (by the overall bandwidth limitations of the transmissions) to a predetermined number (e.g. approximately 34). Using 34 different signalling tone frequencies, the maximum number of groups which can utilize a single repeater system is thus approximately 34×33 (about 1,100). Unfortunately, it has been found in practice that the actual number of groups which can be supported on a single system is somewhat less because of the need to restrict the use of adjacent tones due to increased probability of falsing.

Other prior art systems provide for the "marking" of unused ones of a plurality of available channels. U.S. Pat. No. 3,173,966 to Rypinski (1965),and an IMTS Telephone Service article (designated LBI-8748A) published by General Electric Company teach a multiple channel radio telephone system wherein only a selected one of the available channels is "marked" as an idle channel at any given time but wherein all channels are utilized for passing both control and communication information (there is no single dedicated control channel). Also taught is an interchange of control signals between a mobile unit and a central station before transceive operations are permitted. U.S. Pat. No. 3,707,679 to Bruley et al (1972) also teaches an automatic radio telephone system wherein a selected free channel is "marked" and control signals are interchanged before transceive operations are permitted. See also the following references disclosing the "marking" of idle ones of a plurality of available channels:

U.S. Pat. No. 3,535,636 to Muilwijk (1970)
U.S. Pat. No. 4,009,442 to von Bromssen (1977)
U.S. Pat. No. 3,376,509 to Willcox et al (1968) and
U.S. Pat. No. 3,555,424 to Malm (1971).

Some other references which disclose the broad concept of selecting one of a plurality of available channels for communication are:

U.S. Pat. No. 4,013,958 to Spayth (1977)
U.S. Pat. No. 4,125,808 to Graham (1978)
U.S. Pat. No. 4,129,749 to Goldman (1978)
U.S. Pat. No. 3,808,537 to Sarati et al (1974)
U.K. Pat. No. 850,698 (1960)
U.K. Pat. No. 1,145,899 (1969)
U.K. Pat. No. 1,175,130 (1969)
U.K. Pat. No. 1,185,789 (1970)
U.K. Pat. No. 1,276,941 (1972)
U.K. Pat. No. 1,297,071 (1972)
German Pat. No. 2,030,347 (1978) and
Rybicki et al, *The Basics of Trunked Mobile Radio* (Mobile Times, October, 1980).

SUMMARY OF THE INVENTION

The present invention provides an arrangement for more reliably establishing communication among mobile radio transceivers through a repeater. Utilizing the present invention, transceiver lock onto a non-vacant channel is much less likely to occur and the number of different groups which may be simultaneously supported by a single repeater system is substantially increased. Moreover, the arrangement in accordance with the present invention is fully compatible with existing equipment of the type disclosed in the Bowen et al patent so that performance of such equipment is enhanced when used as part of an overall system using the improved transceiver and repeater of the present invention.

In accordance with the present invention, a system may include at least a first set of radio stations (e.g. those of the Bowen et al type), a second set of radio stations (e.g. those constructed in accordance with this invention) and a plurality of repeaters (e.g. again, as constructed in accordance with this invention so as to be compatible with both the first and second type of radio stations). Each of the plurality of repeaters is capable of relaying radio-frequency communications on a respectively corresponding communications channel.

The first set of radio stations includes at least one radio transceiver having a first channel locating circuit which locates an unused one of the communication channels and a first transmitter which transmits a first type of called-station identifying signal to the corresponding repeater on the thus located unused channel. The second set of radio stations includes at least another radio transceiver including a second channel locating circuit which locates an unused one of the communication channels and a second transmitter which transmits a second type of called-station identifying signal to the corresponding repeater on the thus located unused channel. At least one repeater, constructed in accordance with this invention, includes a receiver which receives the transmissions of the first and second transmitters and also includes a third transmitter which transmits a busy signal in response to received identifying signal transmissions from any of the first and second transmitters. This repeater transmitter, however, interrupts (e.g., temporarily suppresses) transmission of the busy signal in response to the received second type of called-station identifying signal.

The first type of channel locating circuit preferably includes a scanning circuit which scans the communication channels and stops when tuned to a channel not having a busy signal thereon. The first transmitter preferably transmits a busy signal to the corresponding repeater on the thus located channel. The third (i.e. repeater) transmitter then transmits an acquisition signal in response to the busy signal received from the first transmitter. The first channel locating circuit preferably includes a restarting circuit which restarts the channel scanning process unless the repeater transmitter transmits the acquisition signal and the busy signal on the channel being acquired at the correct time.

The second type of channel locating circuit preferably also includes a circuit which scans the communications channels and stops when tuned to a channel not having a busy signal thereon. The second transmitter preferably also transmits a busy signal to the corresponding repeater on the thus located channel. The repeater transmitter preferably also transmits an acquisition signal in response to the busy signal transmitted by the second transmitter. The second channel locating circuit preferably also includes a circuit for restarting the channel scanning process unless the repeater transmitter transmits the acquisition signal and the busy signal according to its predetermined second type of called-station protocol.

The first type of called-station identifying signal protocol preferably includes a plurality of respective tone bursts. Likewise, the second type of called-station identifying signal protocol preferably includes a plurality of respective tone bursts. The number of tone bursts in the second type of protocol preferably is different from the number of tone bursts in the first type of protocol. Each of the plurality of tone bursts in the first protocol preferably has a duration different from the duration of each of the plurality of tone bursts in the second protocol. The third transmitter preferably includes a circuit which determines the duration of at least one tone burst of a received one of the first and second type of called-station identifying signals or their rate of occurrence.

There are also some potential disadvantages caused by an interruption in the busy tone during channel acquisition protocol. For example, other transceivers may waste time trying to acquire the channel (and might even be thus led to false) and/or some transceivers may have relatively short duration channel "drop-out" timers (responsive to a lost busy signal on the channel). Accordingly, to minimize such possible problems while yet retaining the advantages of a temporarily suppressed busy signal, the preferred exemplary embodiment minimizes the duration of the suppressed busy signal.

Another repeater feature which may increase compatibility between existing two-tone type transceivers and a new expanded four-tone trunking system involves control of collection tone duration. A given channel acquisition protocol transmitted by a calling transceiver may itself trigger the repeater to control the duration of a regenerated collect tone signal so as to enhance compatibility in a complex mixed system of transceivers. For example, if the initial transceiver collect tone is less than some predetermined duration, then the repeater may default to a system-duration (e.g. a default duration) regenerated and transmitted collect tone. Otherwise, the regenerated repeated collect tone may simply be extended by the repeater to approximately equal the duration of the incoming collect tone from the calling transceiver. By this technique, the collect tone of an existing two-tone transceiver can be shortened, if desired, to effectively instruct the repeater to issue its regenerated collect tone for the system-designated duration. In this way, transceivers can optionally avoid unnecessarily long collect tone durations (e.g. if they would not normally desire to communicate with groups having significantly more assigned channels). Some older existing transceivers may not be able to detect busy tone when tones 32, 33 or 34 (i.e. the higher-frequency signal tones) are present on the channel (and therefore may not be successful in acquiring a channel when such tones are being used due to the fact that the regenerated repeater protocol of the present new repeater persists beyond the occurrence of the transceiver's calling signals). By thus making the duration of the regenerated collect tone programmable, this possible problem can also be avoided.

The earlier Bowen et al type of system was capable of implementation with a relatively "dumb" repeater. By contrast, the present new expanded capability system (which is still compatible with Bowen et al type transceivers) utilizes a much more "intelligent" repeater. The transceiver of the exemplary embodiment is also improved. In effect, the new composite communication system has programmed "intelligence" distributed between its mobile/portable transceivers and a set of repeaters while yet maintaining compatibility with the earlier Bowen et al type transceivers.

BRIEF DESCRIPTION OF THE DRAWINGS

Many of the additional advantages and features of the present invention will be more readily apparent and the invention will be better understood by reference to the following detailed description of exemplary embodiments considered in conjunction with the accompanying drawings, of which:

FIG. 7a is a more detailed block diagram of one exemplary arrangement for conventionally realizing the signal processor 60, D/A converter 76 and A/D converter 72 of FIG. 7;

FIGS. 7b, 7c and 7d provide exemplary program control flow charts for the transceiver 50 of FIG. 7;

FIGS. 8a, 8b, 8c and 8d provide exemplary program control flow charts for the repeater 100 of FIG. 8;

DETAILED DESCRIPTION OF THE PRESENTLY PREFERRED EXEMPLARY EMBODIMENTS

Figure 2:
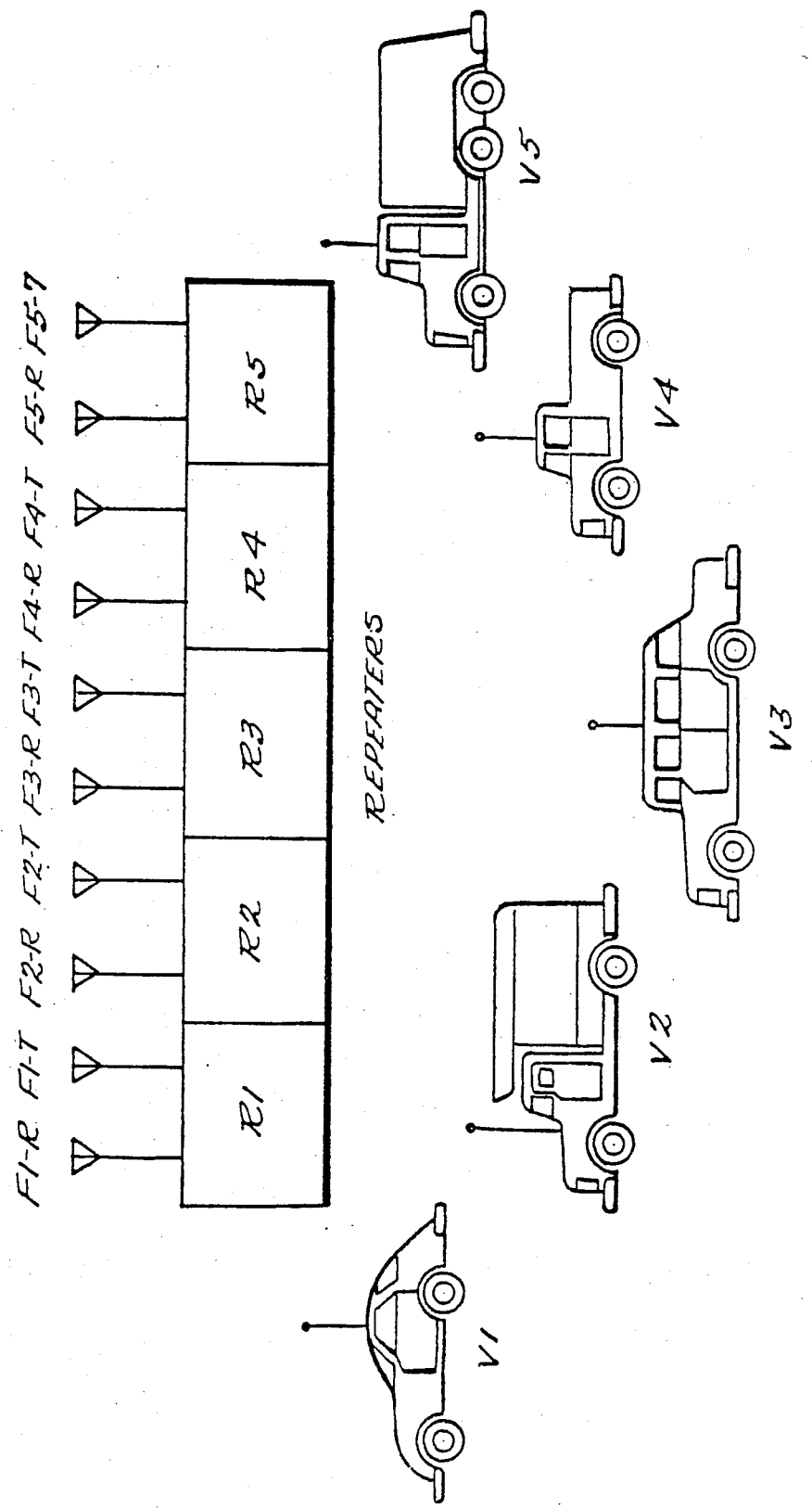
FIG. 2 is a general block diagram of a repeater trunking system according to the present invention.

FIG. 2 is a pictorial diagram of a typical mobile communication system for which the present invention is intended. It is assumed that a particular geographic locality has been allocated five radio repeater communication channels (for example, in bands around 850 MHz), each such channel having a different transmitting and receiving frequency. For five channels, five repeaters R1–R5 are provided and located at an available site that provides optimum coverage of the geographic area (such as, for example, at the top of a tall building, tower or hill). Each of repeaters R1–R5 includes a transmitter, a receiver, and an antenna (either respective transmitting and receiving antennas or a single antenna provided with suitable matching networks well-known in the art may be provided).

For half-duplex operation, in the first repeater, R1, the receiver and receiving antenna function on a frequency F1-R, and the transmitter and transmitting antenna function on a frequency F1-T (which is sufficiently removed in frequency from frequency F1-R, such as by 45 MHz, to provide good frequency separation between transmitted and received frequencies). While the overall system may be full duplex or half-duplex (meaning that different transmitting and receiving frequencies are utilized for each channel but a single mobile station can never transmit and receive simultaneously), repeaters R1–R5 are typically full duplex (meaning that they may each transmit and receive simultaneously). Frequency separation between transmitting and receiving frequencies for each repeater is necessary to adequately filter the transmitted signal from the input signal applied to the receiver to permit such simultaneous reception and transmission. Other frequencies F2-R and F2-T through F5-R and F5-T are likewise provided for repeaters R2 through R5, respectively.

In the same locality, different groups of users may utilize the repeaters by using mobile transceivers in their mobile vehicles V1 through V5. Of course, the arrangement in accordance with the present invention is not limited to mobile transceivers, but can be used also with "base" (stationary) stations, portable stations, etc. Typically, each group or set of mobile stations has a common basis. For example, all of the vehicles owned by a given business (such as a taxi cab corporation, a fleet of oil delivery trucks, etc.) may be in the same group or set. The number of groups which a repeater can serve depends upon a number of different factors including the amount of communication time required by each group, the number of repeater channels available, etc. For example, five repeaters (each including a transmitter and receiver) each operating on a different communications channel may serve as many as 2,000 vehicles. However, the number of groups which can be efficiently served may change depending upon the demand for channels and communication time.

If there are a number of repeater channels available in a given locality, it is desirable that a vehicle be able to quickly ascertain which communication channels are available to permit it to establish communication with the other vehicles in its group using a channel not presently in use by any other group. The present invention provides an arrangement and method for providing and establishing this communication in a relatively simple but highly reliable fashion.

Figure 3:
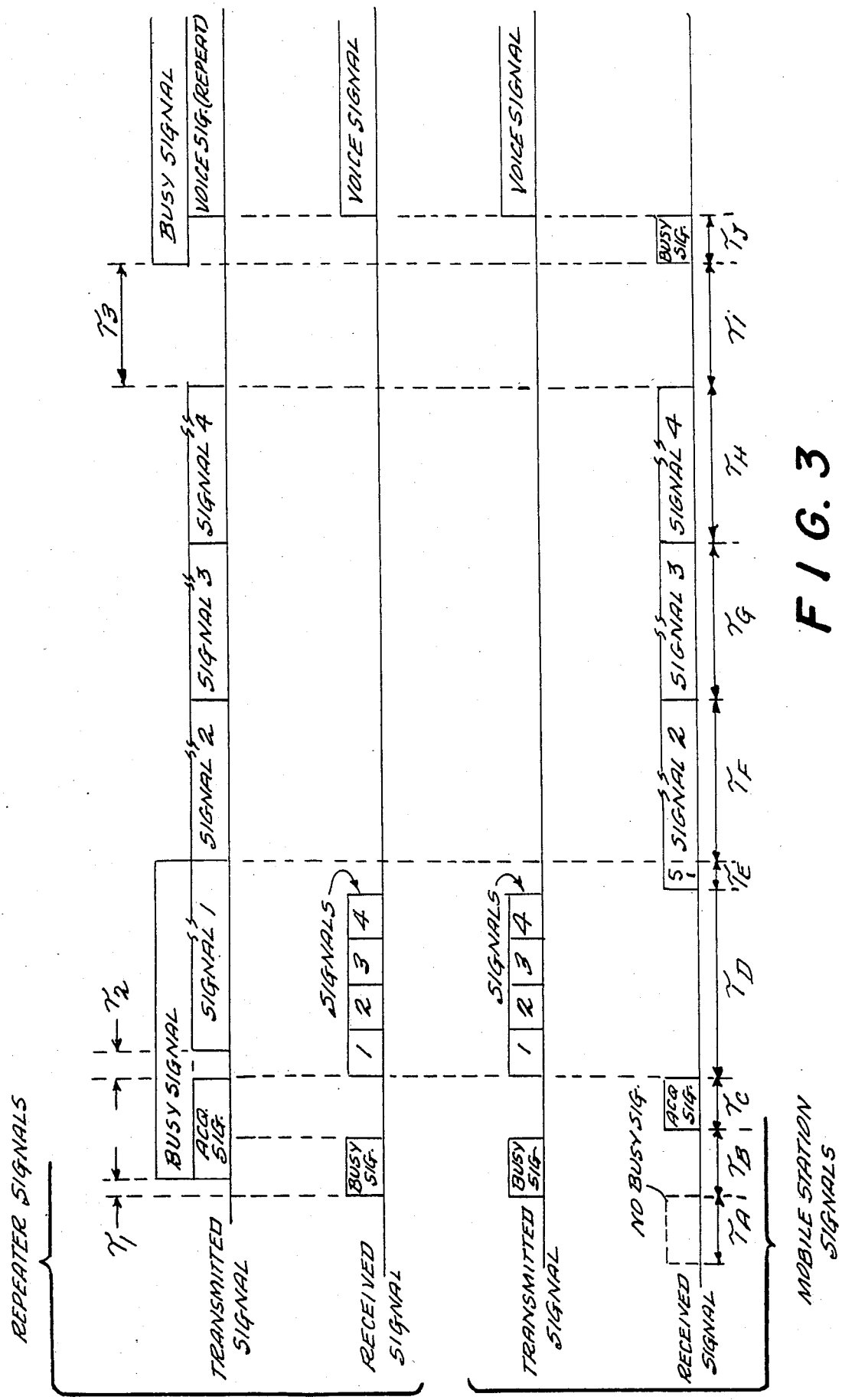
FIG. 3 is a graphical illustration of a channel acquisition protocol signalling sequence in accordance with the present invention.

FIG. 3 is a graphical illustration of the signalling sequence (transaction) occurring between a repeater and a mobile station in a particular group which is desirous of acquiring a dedicated communication channel for communicating with other mobile stations in its group via the repeater. The exchange of signals shown in FIG. 3 could work equally well with only one available channel, but is most advantageously used for dedicating one of a plurality of different channels.

The repeater signals shown in FIG. 3 include a received signal (i.e. the output of the receiver portion of the repeater) and a transmitted signal (i.e. the output of the transmitted portion of the repeater). Likewise, the signals shown associated with the mobile station include a received signal (i.e. the output of the receiver portion of the mobile station transceiver) and a transmitted signal (i.e. the output of the transmitter portion of the mobile station). It will be noticed that the receiver of the repeater receives the signals produced by the transmitter of the mobile station, so that the repeater's received signals exactly correspond to the mobile station's transmitted signals. Likewise, the mobile station receives the signals transmitted by the repeater transmitter, so that the received signal of the mobile station corresponds to the transmitted signal of the repeater (however, these last-mentioned signals may not exactly correspond to one another because the mobile station is capable of only half-duplex operation in the preferred embodiment, i.e. it cannot both receive and transmit simultaneously).

When a mobile station (as commanded by a user, as will be explained in greater detail shortly) desires to obtain a dedicated communication channel, it enables its receiver onto a likely channel and "listens" for the presence of a busy signal. If a busy signal is present on the channel (indicating that the channel is presently in use), the mobile station will leave the communication channel and select another channel. However, if no busy signal is present (interval $\tau_A$), the mobile station transmits a busy signal on the channel ($\tau_B$). The busy signal transmitted by the mobile station in the preferred embodiment is a sinusoidal tone which modulates the transmitted carrier of the mobile station by a predetermined percentage.

The repeater receives the busy signal transmitted by the mobile station and verifies that the received signal is in fact a busy signal (by filtering, etc.). The repeater responds to the busy signal by transmitting its own busy signal and simultaneously transmitting an acquisition signal. The busy signal transmitted by the repeater preferably has the same characteristics as the busy signal transmitted by the mobile station (in order to facilitate mobile-to-mobile interaction), but may have different characteristics depending upon the application. The acquisition signal transmitted by the repeater in the preferred embodiment is a sinusoidal tone having a frequency different from that of the busy signal. The acquisition tone transmitted by the repeater continues after the busy signal transmitted by the mobile station ceases so that when the mobile station is finished transmitting the busy signal, it can switch to the receive mode and determine if the repeater has responded to its busy signal with an acquisition signal.

If the mobile station does not detect an acquisition signal in response to the transmission of its busy signal, it will assume that the communication channel which it has selected is unavailable and will switch to the next channel. However, if the mobile station detects an acquisition signal ($\tau_C$) in response to its busy signal ($\tau_B$), the mobile station transmits four respective tones (signal 1, signal 2, signal 3 and signal 4 preferably of equal duration of 90 milliseconds each) which contain information identifying the called group of mobile stations with which the mobile station desires to communicate ($\tau$D).

Signals 1-4 are 90 millisecond-long tone bursts in the preferred embodiment, each of which may have one of 38 different selectable frequencies. Each of tone bursts signal 1-signal 4 may, of course, take on any one of these 38 different frequencies (except for the frequency of the just preceding tone burst, this limitation being imposed to enable mobile stations to more easily distinguish between the different contiguous tone bursts). In the preferred embodiment, nearly two million ($37^4$) different called groups may be encoded by tone bursts signal 1-signal 4. The choice of four signals chosen from a group of 38 different tone frequencies is a function of the preferred embodiment, and not a limitation of the invention.

The repeater receives the tone bursts signal 1-signal 4 and may determine the length of the first such burst (signal 1) by simply determining when a change in frequency occurs (hence, in this embodiment, signal 1 and signal 2 should have different frequencies if they are to be transmitted contiguously in time). If tone burst signal 1 has a first predetermined length (such as 540 milliseconds for a five channel system of the Bowen et al type), the repeater will recognize the mobile station as being of the Bowen et al type which, in current commercial embodiments, transmits only two signalling tones (such as the signalling sequences shown in FIG. 1). If a two-tone sequence is being sent, then the repeater will respond (as in the prior art Bowen et al type system) by continuously transmitting a busy signal and by regenerating (i.e. producing internally rather than simply repeating) the first tone burst and the second tone burst (group signal and subgroup signal) for 540 milliseconds for the first burst and 450 milliseconds for the second. The repeater will then transmit a busy signal for at least a predetermined amount of time (of 90 milliseconds duration in the preferred embodiment) to enable the mobile station to verify that the channel has been dedicated and that the signalling sequence has been properly transmitted, as was previously described.

However, if the first tone burst signal 1 has a duration less than the first predetermined duration (for instance, a predetermined duration of 90 milliseconds in the preferred embodiment), the repeater recognizes the mobile station transmitting the signalling sequence as possibly being of the new "expanded" type which transmits four tone bursts (the repeater may have only caught the last portion of signal 1). The repeater then checks to absolutely confirm that a four-tone expanded type called-signalling sequence is actually occurring. In the preferred embodiment, the repeater begins regenerating and transmitting the signal frequency of tone burst signal 1 (e.g. as soon as signal 1 is detected), the time for detection of the first tone being represented by $\tau_2$ in FIG. 3. The repeater transmits tone burst signal 1 for the same first predetermined time period (540 milliseconds) in the preferred embodiment even though the mobile station only transmits the first tone burst for a much shorter period of time. At the conclusion of the transmission of tone burst signal 1 by the repeater, the repeater determines whether two or four-tone signalling was received by counting the number of tones it has received from the calling mobile station. If three or more tones have been received, a four-tone sequence is assumed, and the repeater likewise regenerates tone bursts signal 2, signal 3 and signal 4 for 180 milliseconds each in the preferred embodiment (in a manner which will be described in greater detail shortly). Tone bursts signal 2-signal 4 (or at least portions thereof) are transmitted without the busy signal, however (the repeater terminates the busy signal transmission with the end of the first tone burst signal 1 or possibly during tone burst signal 2).

The tone burst signal 1 is transmitted for a sufficiently long period of time by the repeater so that the mobile station can complete transmission of all four tone bursts signal 1-signal 4 at the shorter duration (e.g. 90 ms each) and switch to the receive mode in time to yet receive ("e.g. catch") at least a final portion of the first tone burst signal 1 transmitted by the repeater (and, of course, all of the regenerated tone bursts signal 2-signal 4 which may be of somewhat shorter durations because such an extra timing requirement is no longer then present). The mobile station may verify that the frequencies of regenerated tone bursts signal 1-signal 4 transmitted by the repeater match the frequencies of the tone bursts which it initially itself transmitted to provide added reliability and to prevent errors. If the frequencies of the regenerated tone bursts signal 1-signal 4 transmitted by the repeater do not correspond to the frequencies initially transmitted by the mobile station, the mobile station may terminate the called-station signalling sequence and switch to another communication channel to try again.

If the frequencies of regenerated tone bursts signal 1-signal 4 transmitted by the repeater correspond to the frequencies of the tone bursts transmitted by the mobile station, the mobile station waits a time period $\tau_i$ during which it does nothing. $\tau_i$ is preferably of a predetermined duration (180 milliseconds in the preferred embodiment). During time period $\tau_i$, the repeater is transmitting neither a busy signal, an acquisition signal nor a tone burst; rather, it is transmitting only a "dead" (unmodulated) carrier. Time period $\tau_i$ is used to help prevent mobile stations of the twotone type from falsing on four-tone type signalling sequences, as will be explained shortly.

Upon the conclusion of time period $\tau_i$, the repeater begins transmitting the busy signal once again. The mobile station receives the busy signal transmitted by the repeater (during time period $\tau_J$) and recognizes that the signalling sequence is completed and that the communication channel has been dedicated to it. The mobile station enables itself into the "ready" mode and alerts the user (such as by an audible alarm or an indicator lamp) that a channel has been obtained and that voice communication may commence. The user may use a microphone to transmit voice information from the mobile station to be received and repeated (i.e. retransmitted) by the repeater.

The transmission of regenerated tone bursts signal 1-signal 4 transmitted by the repeater is also received by all activated mobile stations which are not presently being used on another communication channel for signalling or voice communications. The unused (or "idle") mobile stations constantly scan the communication channels assigned to them at a predetermined rate in search of channels transmitting a signalling sequence. The scanning rate of the mobile stations is fast enough so that they will scan the entire sequence of communication channels during the repeater-generated duration of tone burst signal 1 (and therefore will not miss any transmitted tone burst). This implies that in other embodiments the duration of signal 1 will need to be lengthened as the number of channels is increased. Each mobile station recognizes at least one predetermined sequence of frequencies of tone bursts signal 1–signal 4 as its group identifying signal (it is possible for mobile stations to have more than one group identifying signal and thus be in more than one group if desired). If the first tone burst signal 1 transmitted by the repeater corresponds to the first tone burst frequency of the receiving mobile stations group identifying signal, the mobile station will listen for the next tone burst to compare the frequency of the second tone burst with the second frequency of the mobile stations group identifying signal. This process continues to permit the mobile station to compare the sequence of four tone bursts signal 1–signal 4 with the sequence of frequencies of its own group identifying signal. If the four tone bursts signal 1–signal 4 match the group identifying signal of a receiving mobile station, the mobile station will wait a predetermined time period $\tau_I$ and then determine if a busy signal is transmitted during time period $\tau_J$.

If no busy signal is transmitted, the mobile station concludes that the signalling sequence was invalid, resets itself, and begins once again searching the communication channels for a signalling sequence addressed to it. If, however, the busy signal is received, the receiving mobile station enables itself into the "ready" mode, alerts the user (such as by an audible alarm) that an incoming call has arrived, and is ready to be used for voice communications. The receiving mobile station in the preferred embodiment connects an audio transducer to the output of its receiver section so that a user may listen to the voice signals being transmitted over the now dedicated communication channel. The repeater continuously transmits the busy signal along with the voice signal which it is repeating to prevent other mobile stations wishing to originate a call from attempting to seize the dedicated communication channel.

When the repeater fails to receive a voice signal (marked by the presence of a busy signal) for a predetermined time (such as 10 seconds), it will "time out" (i.e. assume that the group of mobile stations to which the communication channel had been dedicated are through using the channel and release the channel to other groups). To time out, the repeater may simply terminate the transmission of the busy signal. The mobile stations using the dedicated channel may sense the absence of the busy signal and reset into an idle mode once again. Alternatively, the mobile stations may each include timers which reset the stations automatically upon failure to receive voice information for a predetermined period of time.

Figure 4:
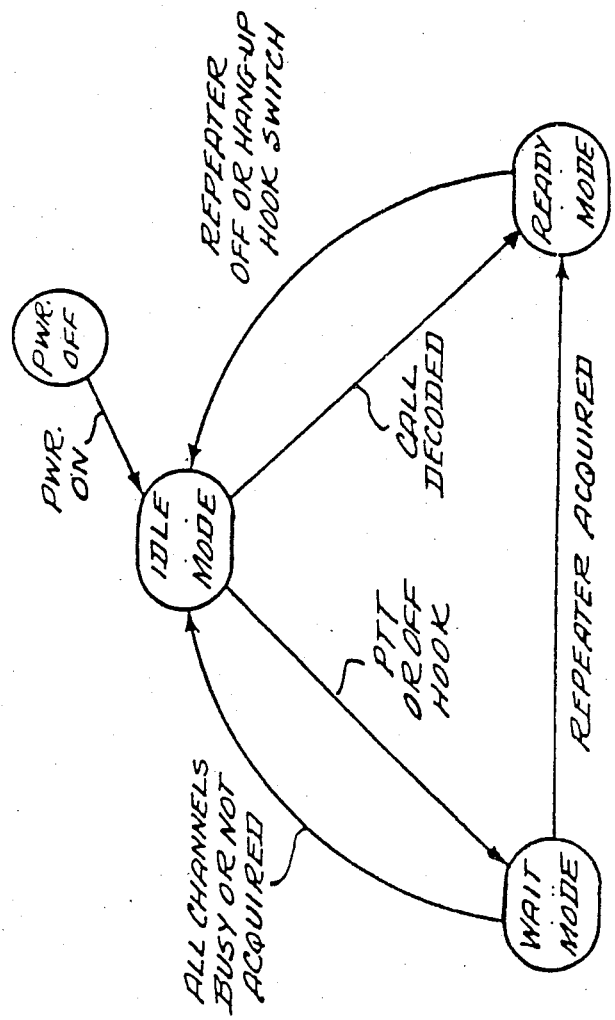
FIG. 4 is a graphical representation of the various operating modes of a transceiver in a trunking system according to the present invention.

FIG. 4 is a pictorial diagram indicating the various modes of operation of the repeater trunking system in accordance with the present invention. The "call originate" and "idle" modes are broken down into the functional modes (states) of "idle", "wait" and "ready". When power is initially applied to a mobile station, the mobile station is placed in the idle mode. In the idle mode, a mobile station continuously scans the communication channels for a call identifying the particular group with which it is associated. All audio circuits of the mobile station are inhibited in this mode so that the user is undisturbed. If a call is decoded indicating that a particular mobile station is within a group being called and the channel communicating the call is in fact dedicated to that group, that mobile station is placed in the ready mode. In the ready mode, the mobile station is locked onto a channel and ready to communicate. The audio circuits are enabled and an indicator lamp (not shown) is illuminated. An audible alarm (such as four alert beeps) is sounded by the mobile station upon entry of the mobile station into the ready mode to alert an operator that a call has come in.

If the repeater which caused the mobile station to lock onto the channel goes off the air or communication is otherwise interrupted, the mobile station returns to the idle mode from the ready mode and resumes searching for calls identifying the particular group with which it is associated.

From the idle mode, if a user desires to originate a call (such as by depressing a push-to-talk (PTT) button located on, for instance, a handheld microphone), the mobile station operates in the wait mode. In the wait mode, the station stops scanning on the first idle one of the communication channels (indicated by the absence of a busy signal) and attempts to acquire the corresponding repeater. The station sends a busy signal to the repeater and waits to hear an acquisition signal (as previously described). During this procedure, an indicating lamp is illuminated and the audio circuits of the mobile station are disabled. After all channels have been tried without acquiring a repeater, the mobile station may inform the user that no idle communication channels are available (for instance, by sounding an audible beep).

If all channels are busy or if the mobile station has failed to establish communication with a repeater, the station returns to the idle mode. However, if a repeater is acquired (as indicated by the confirming signalling handshake of the acquisition signal transmitted by the repeater and received by the mobile station as previously described), the station proceeds to transmit the desired group signal (i.e. the four tone bursts signal 1–signal 4).

As mentioned previously, mobile stations of the two-tone type may "false" on four-tone signalling sequences (i.e. may mistake parts of the four-tone signalling sequences for their own two-tone signalling sequences) if the same frequency tones are used for both types of signalling sequences unless precautions are taken. Of course, ways of distinguishing between the two-tone signalling sequences from the four-tone signalling sequences could be used to permit receivers to distinguish between the two different sequences. For instance, the four-tone signalling sequences could use entirely different signalling frequencies than do the two-tone signalling sequences. However, such differentiation might require extensive modification of the existing mobile stations already utilizing the two-tone sequence, which would be very expensive, would severely restrict the number of sequence combinations available, and should be avoided if at all possible. The present invention prevents falsing using very simple techniques while permitting, although not requiring, the two-tone and four-tone signalling sequences to use exactly the same tone frequencies.

Figure 1:
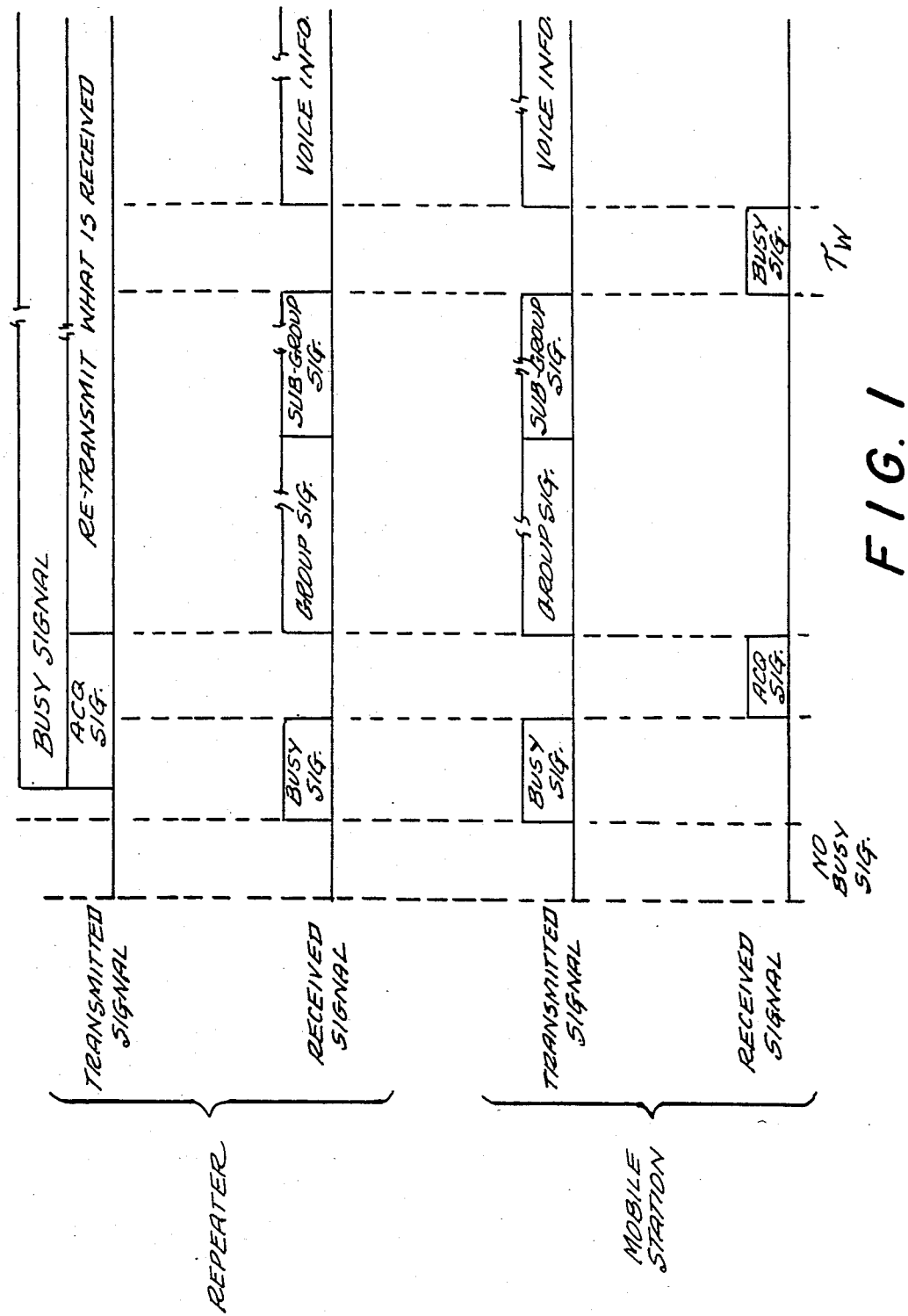
FIG. 1 is a graphical illustration of the channel acquisition protocol signalling sequence of a certain prior art system.

As can be seen from FIG. 1, the repeater when responding to a prior art two-tone signalling sequence will typically continuously transmit the busy signal for the duration of the signalling sequence as well as during voice signal retransmission. In contradistinction, the repeater in the present new expanded system interrupts the transmission of the busy signal during a part (preferably the last part) of the four-tone channel acquisition protocol signalling sequence and resumes it only when the signalling sequence has terminated and voice signal retransmission is to begin. In particular, the repeater, in responding to a four-tone signalling sequence, does not transmit the busy signal during the time signals 2 (or at least a part thereof), 3 and 4 are regenerated by the repeater and for a predetermined time period $\tau_i$ after the fourth tone burst signal 4 is transmitted by the repeater.

If the four-tone and two-tone signalling sequences utilize exactly the same frequencies or tones, mobile stations of the two-tone type cannot distinguish on the basis of frequency alone between two contiguous tones of a four-tone sequence and their own two-tone sequence. For instance, a mobile station of the two-tone type having a group or "collect" identifying signal comprising a first tone burst of frequency A followed by a second tone burst of frequency B may mistake four-tone bursts ABCD, CABD, CDAB, etc. (where C and D are bursts having frequencies different from A and B) as its own preassigned group identifying signal. Moreover, if the two-tone type mobile stations do not require contiguous tone bursts in their group identifying signals, an even greater falsing problem can exist; a two-tone type mobile station having a group identifying signal of AB may false on ACBD, CADB, etc. The present invention helps prevent falsing by providing, during a four-tone signalling sequence, a predetermined time (e.g. $\tau_i$) wherein no busy signal is transmitted.

Figure 5:
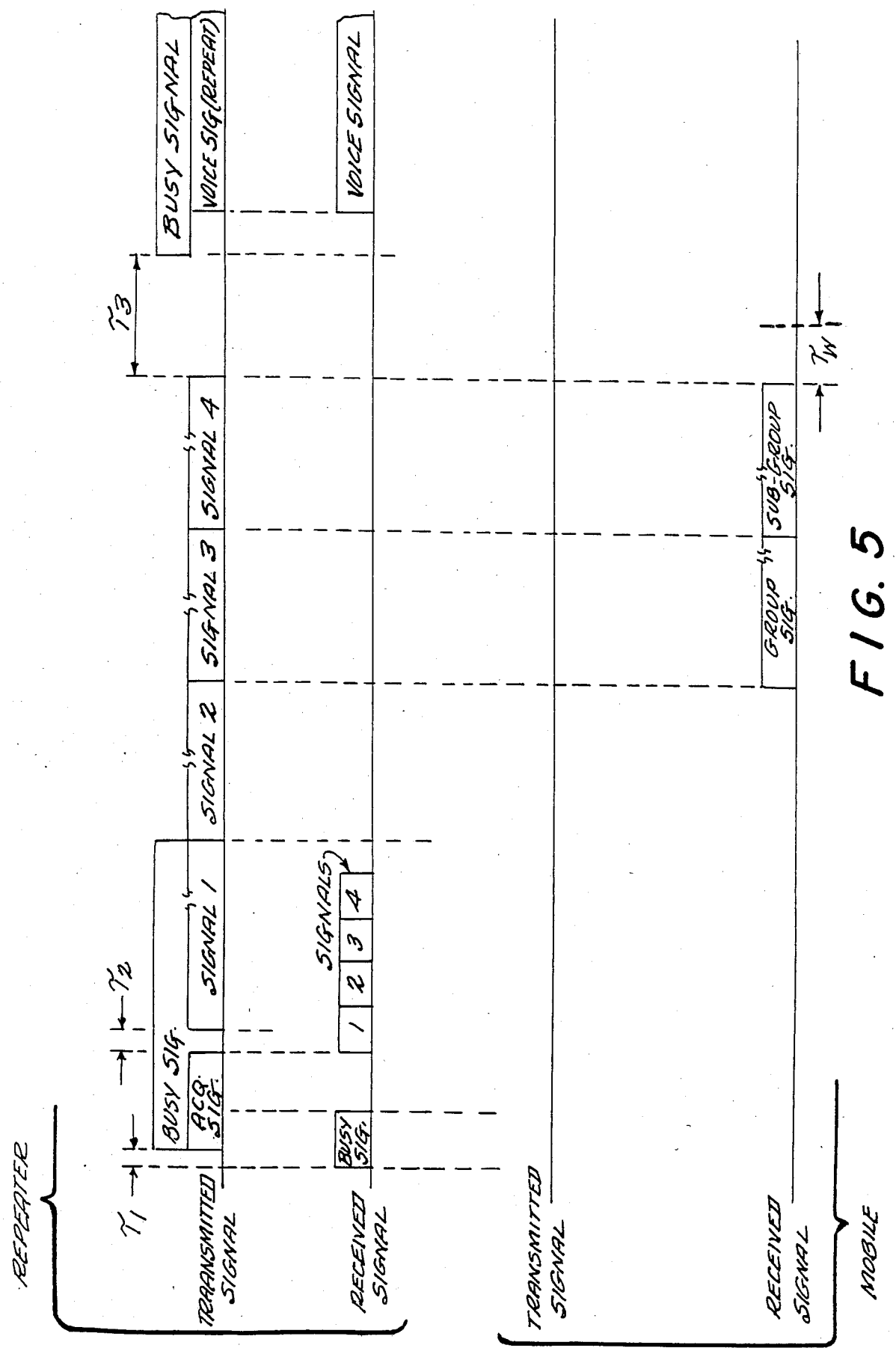
FIG. 5 is a graphical illustration of a signalling sequence in accordance with the present invention occurring when a two-tone mobile station is prevented from "falsing" on a four-tone identifying signal.

It will be remembered from the discussion of FIG. 1 that a conventional two-tone type mobile station will only assume it has acquired a channel upon receiving a busy signal during a time period (window) $\tau_w$ after it has transmitted its two tones (e.g. sometime during $\tau_i$). Referring to FIG. 5, if the repeater fails to transmit the busy signal during this time $\tau_w$, the mobile station will go back into its idle mode and begin searching again for its group identifying signal. In accordance with the present invention, when a repeater responds to a four-tone signalling sequence, it guarantees that a time period $\tau_3 > \tau_w$ exists after any (each) two contiguous tone bursts during which it transmits no busy signal. For example, any two-tone type mobile stations which might false on the last two tone signals of a four-tone signalling sequence will not hear the busy signal, and will therefore "drop" (i.e. leave) the channel. Because a two-tone mobile station might possible mistake any two tones of a four-tone signalling sequence (e.g. signal 1 and signal 2, signal 2 and signal 3, even possibly signal 1 and signal 3) for its own two-tone group identifying signal, the repeater guarantees that the busy signal is never present after any such combination. Thus, combinations of signals 1, 2 or 3 which might also false a two-tone type mobile are also followed, in the exemplary embodiment, by a time period during which the busy signal is not transmitted thereby causing the two-tone type mobile to drop the channel rather than to false.

Figure 6:
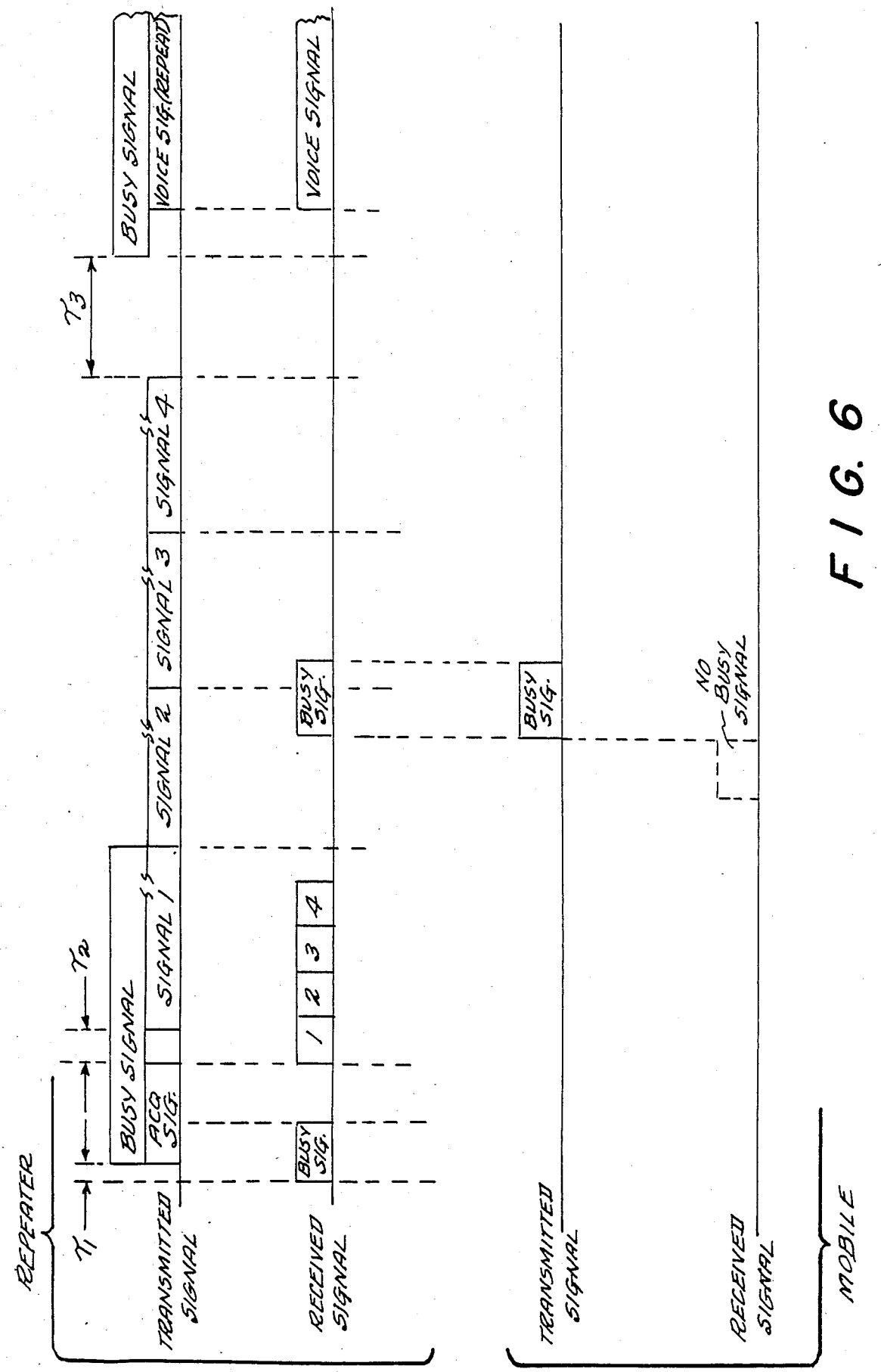
FIG. 6 is a graphical illustration of a signalling sequence in accordance with the present invention occurring when a two-tone mobile station attempts to acquire a channel during the four-tone signalling sequence automatically is prevented from doing so.

Of course, the busy signal is also used to alert other mobile stations desirous of acquiring a dedicated communication channel that the communication channel is in use. However, this desired function is largely undisturbed by the relatively short and infrequent interruptions in the busy signal now proposed to occur during the channel acquisition protocol. It is very rare that another mobile station will attempt to acquire a particular communication channel at exactly the same time that a first station is engaged in the four-tone acquisition signalling sequence with the repeater. Nevertheless, it is possible that a mobile station desirous of acquiring a channel may begin receiving a repeater transmission while it is transmitting tone bursts signal 2-signal 4 of a four-tone signalling sequence or during time period $\tau_3$ during which the repeater is transmitting a dead carrier. If this occurs, the mobile station desirous of originating a call will not hear a busy signal therefore and will initially assume that the channel is idle. The mobile station will transmit a busy signal and will wait for the repeater to respond to its transmitted busy signal with an acquisition signal (as is shown in FIG. 6). The repeater will not, of course, so respond (the acquisition signal is preferably an audio tone which is relatively far removed from any of the tones used for tone bursts signal 1-signal 4 so that a mobile station can never mistake a tone burst for the acquisition signal), and will therefore drop the channel and scan in search of another idle channel.

Hence, although the absence of the busy signal for a short period of time during the four-tone channel acquisition signalling sequence may cause slightly increased average access time to a communication channel, the time during which the busy signal is absent is so short (less than one second in the preferred embodiment) and so infrequent in occurrence that it is relatively rare for it to ever cause a mobile station desirous of originating a call erroneously to assume a used channel to be idle. Moreover, this extra access time is well worth the advantage of accommodating both a two-tone signalling sequence and a four-tone expanded signalling sequence on the same repeater system.

Figure 7:
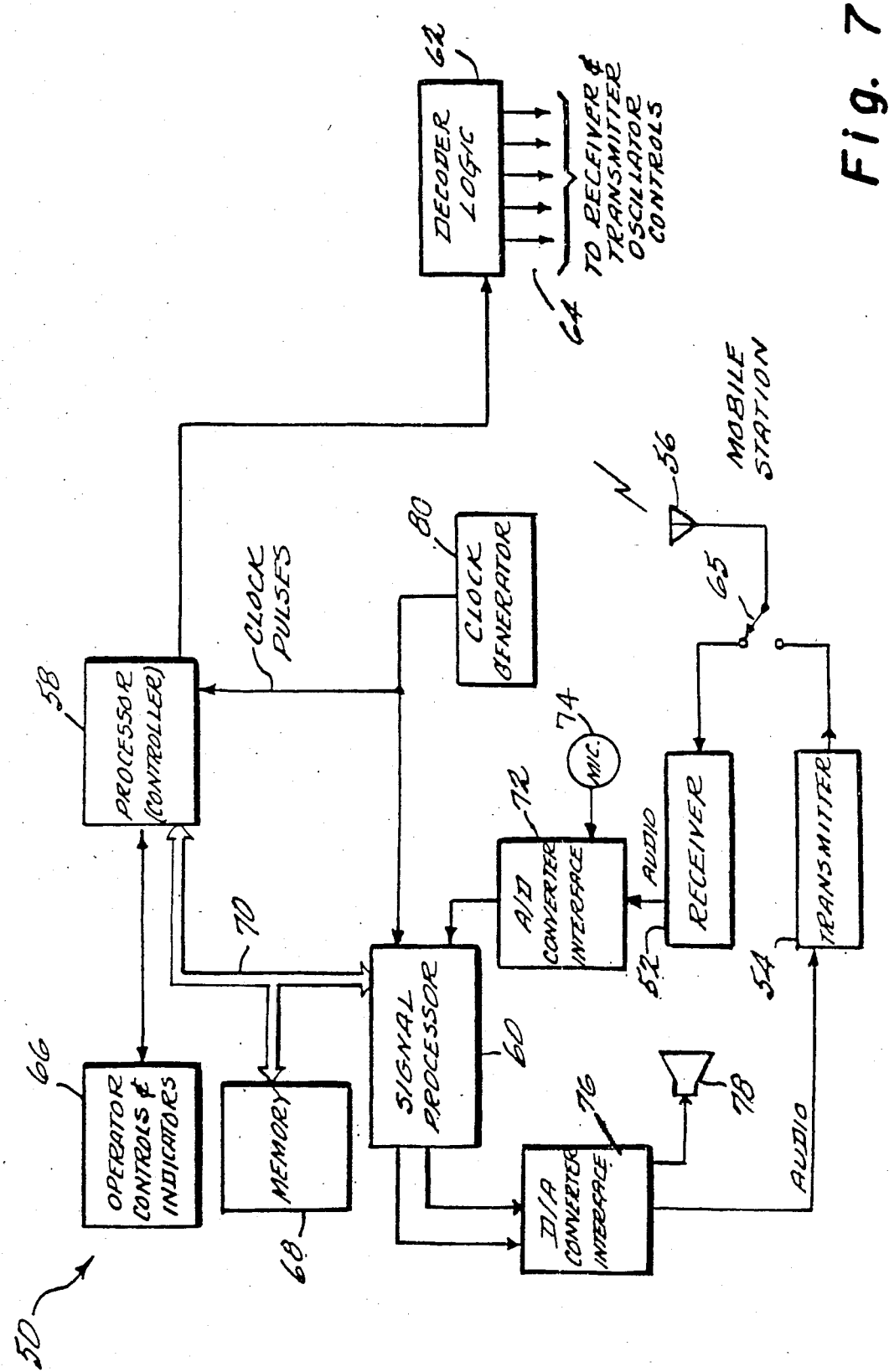
FIG. 7 is a block diagram of an exemplary mobile transceiver station in accordance with the present invention.

FIG. 7 is a block diagram of a mobile station 50 in accordance with the present invention. It is assumed that mobile station 50 is installed on board one of a group of vehicles V1-V5 shown in FIG. 2.

Mobile radio station 50 includes a receiver 52, a transmitter 54, an antenna 56, a processor 58 and a signal processor 60. Receiver 52 is capable of operating on any one of the frequencies F1-T through F5-T, while transmitter 54 is capable of operating on any one of the frequencies F1-R through F5-R. Two frequencies are needed for each channel so that mobile station 50 and a repeater can function in a half-duplex mode (i.e. nonsimultaneous communication between the mobile station and the repeater using two frequencies). Thus, the mobile station would transmit on a repeater receive frequency (for example F1-R). The signal on frequency F1-R would be received by the repeater and transmitted to the other vehicles on frequency F1-T. The other vehicles in the group would receive the signal on repeater frequency F1-T. When transmitting, the other vehicles would transmit on frequency F1-R. In such an arrangement, a single antenna 56 is switched by a relay 65 (or some other suitable switching device) between transmitter 54 and receiver 52 depending upon whether the mobile station is transmitting or receiving.

As mentioned previously, the repeater to which mobile station 50 communicates operates in a full duplex mode in the preferred embodiment (i.e. it can receive and transmit simultaneously). Full duplex operation could be provided in mobile station 50 by using these same two frequencies but with separate receive and transmit injection, a duplexer, and separate antennas (as is well known in the art). Other means of providing full duplex operation could be provided instead (as is well known in the art), and the present invention is by no means limited to the half-duplex arrangement shown.

It is assumed in the presently preferred, non-limitative, exemplary embodiment that receiver 52 and transmitter 54 are frequency modulation devices (although they may be modulated using any convenient method, such as amplitude modulation). Transmitter 54 includes a conventional oscillator circuit (not shown) which operates at one of five transmit frequencies depending upon the signal applied to it by decoder logic 62. Receiver 52 is preferably of the superheterodyne type and includes a local oscillator which also operates at a frequency corresponding to one of five frequencies depending upon the signal supplied by decoder logic 62. Decoder logic 62 is connected to an output of processor 58 (which in the preferred embodiment comprises a standard Intel Microprocessor Integrated Circuit device such as an 8051 or the like together with conventional support devices) which monitors and controls the state of mobile station 50, as well as controls the operation of signal processor 60 (to be described shortly). Processor 58 applies signals to decoder logic 62 (which may be a standard logic array comprising digital logic gates or MSI decoder chips, shift registers, etc.) which causes the decoder logic to sequentially produce frequency scanning signals at each of the five outputs 64 in a well-known manner. These scanning signals are applied to the oscillators of receiver 52 and transmitter 54 to cause transmitter 54 to be sequentially operable on radio frequencies F1-R through F5-R, and receiver 52 to be sequentially operable on the radio frequencies F1-T through F5-T. Of course, decoder logic 62 could comprise a sequential machine which is simply enabled or disabled by processor 58, or the processor could directly control the oscillator frequencies of receiver 52 and transmitter 54 by writing information to digital data ports on the receiver and the transmitter.

Mobile station 50 includes operator controls and indicators 66 which enable a human user to operate the mobile station and to have indications of the status of the station. The user controls permit the operator to place his or her station in the call originate mode to establish communication with another vehicle in the same group, or to place his or her station in the idle or scanning mode so that it will receive communications from other mobile stations in the same group. Although operator controls and indicators block 66 is shown as communicating only to processor 58, it will be understood that other communication paths might also be desirable depending upon the precise indications and control included in the block.

The heart of mobile station 50 is processor 58 and signal processor 60 and the interaction between the two of them. Processor 58, signal processor 60 and a memory 68 (e.g. a "personality" defining PROM which, among other data, may assign a particular called station identity corresponding to at least one particular group tone S1 and subsequent identifying tones S2, S3, S4) communicate with one another over a conventional bi-directional data bus 70. Processor 58 may write information to signal processor 60 and read information from signal processor 60 via data bus 70. Processor 58 may read (and write) information from (to) memory 68 (which preferably comprises a conventional random access or read only memory) via bus 70. If desired, an additional address bus (not shown) may be used by processor 58 to address specific locations in memory 68 and specific control registers in signal processor 60.

Signal processor 60 in the preferred embodiment is a special large-scale integration (LSI) signal processing integrated circuit having the designation 7720 (manufactured by Nippon Electric Company). Signal processor 60 in the preferred embodiment is a general programmable signal-processing device capable of performing a wide variety of tone generation and filtering functions. The NEC 7720 has one serial digital input port and one serial digital output port which provide full duplex transfer of data between the NEC 7720 and the A/D converter 72 and D/A converter 76. The NEC 7720 controls the function of each of the different input-output channels independently. The NEC 7720 also is provided with at least one parallel digital port (not shown). By writing different binary numbers to this digital port of the NEC 7720, the device can be made to perform such functions as OFF, reset, decode, encode, DTMF (dual tone multi-frequency) digital filtering, etc. Other information written into the control registers of this very versatile device controls the filtering functions performed, the tone frequencies generated, etc. The device when enabled into its decode mode of operation produces information indicating that a tone is present on its input and the frequency of the tone which is present.

A more detailed block diagram is provided in FIG. 7a which depicts one conventional architecture for realizing the signal processor 60 and A/D and D/A converters 72, 76 of FIG. 7. The operation and architecture of CODECs 75, 75a, timing circuits 60a, and duplex side tone cancellation circuits 52a are believed to be self explanatory to those skilled in the art. In the conventional architecture shown, each of CODECs 75, 75a may at times function as A/D converter 72 and at times function as D/A converter 76, in a well-known manner).

In the preferred embodiment of mobile station 50, signal processor 60 performs all necessary filtering on signals being transmitted and received (such as to tailor audio response, to eliminate excess hiss, noise, "hash", etc., and to provide any pre-emphasis or de-emphasis not provided by receiver 52 and transmitter 54). Signal processor 60 also removes the busy signal from the audio output produced by receiver 52 (i.e. it functions as a notch filter) and inserts a busy tone into the audio provided to transmitter 54. Signal processor 60 also detects and/or generates one of 38 tones at frequencies, times and durations specified by processor 58. Finally, signal processor 60 in the preferred embodiment is used to detect and/or generate DTMF tones for signalling applications other than those associated with the signalling sequence between mobile station 50 and a repeater (such as for touch-tone dialing onto a standard land line, for billing and other information transmittal, for increased security of transmissions, etc.).

The audio output of receiver 52 is applied to the input of an analog-to-digital (A/D) converter interface 72. The audio output of a microphone 74 is also provided (after necessary amplification, filtering and dynamic range compression if desired) to the audio input of A/D converter 72. A/D converter 72 converts the analog audio inputs applied to it to digital signals in a well known manner. A/D converter 72 samples the audio inputs applied to it at a predetermined rate which is sufficiently high to reduce quantization error to an acceptably low level. A/D converter 72 applies its digitized output to an input port of signal processor 60.

Signal processor 60 produces two respective digital outputs (one of which is used primarily for tone generation and the other one of which is used for outputting the output signal produced by A/D converter 72 after it has been suitably processed by the signal processor) to a digital-to-analog (D/A) converter interface 76 of conventional design. D/A converter 76 actually comprises two independent D/A converters which may simultaneously convert the digital outputs of signal processor 60 into analog signals and simultaneously apply both of the converted digital signals to the audio input of transmitter 54. Alternatively, D/A converter 76 may apply its audio output signal to a loudspeaker 78 (after appropriate amplification).

As mentioned previously, processor 58 controls the functions of signal processor 60 by transmitting digital control words to the signal processor via data bus 70. Memory 68 stores program instructions (software) which are accessed by processor 58 and executed in a well-known manner. Processor 58 controls the sequences of operation of mobile station 50 in accordance with the instructions stored in memory 68 and, in particular, specifies the functions of signal processor 60 at any given instant in accordance with these program instructions. The state of the microprocessor programming art has risen to such a highly-developed and advanced stage and the programming utilized by the preferred embodiment is so conventional that it is not believed necessary to further detail the instructions stored by memory 68 and executed by processor 58 except by describing the tasks which the instructions cause processor 58 to perform. The controlling of signal processor 60 by processor 58 is conventional and can easily be understood by carefully studying the publicly-available data sheets published by NEC which describe the operation of the NEC 7720. Computer simulation programs of a well-known type may be used to develop the filtering parameters used to control signal processor 60 to operate in its decoding mode and in the mode of operation wherein it processes the audio produced by microphone 74 or receiver 52.

Clock generator 80 is conventional in design and provides square-wave timing signals to processor 58, signal processor 60 and any other ones of the components of mobile station 50 which require timing information.

Figure 7B:
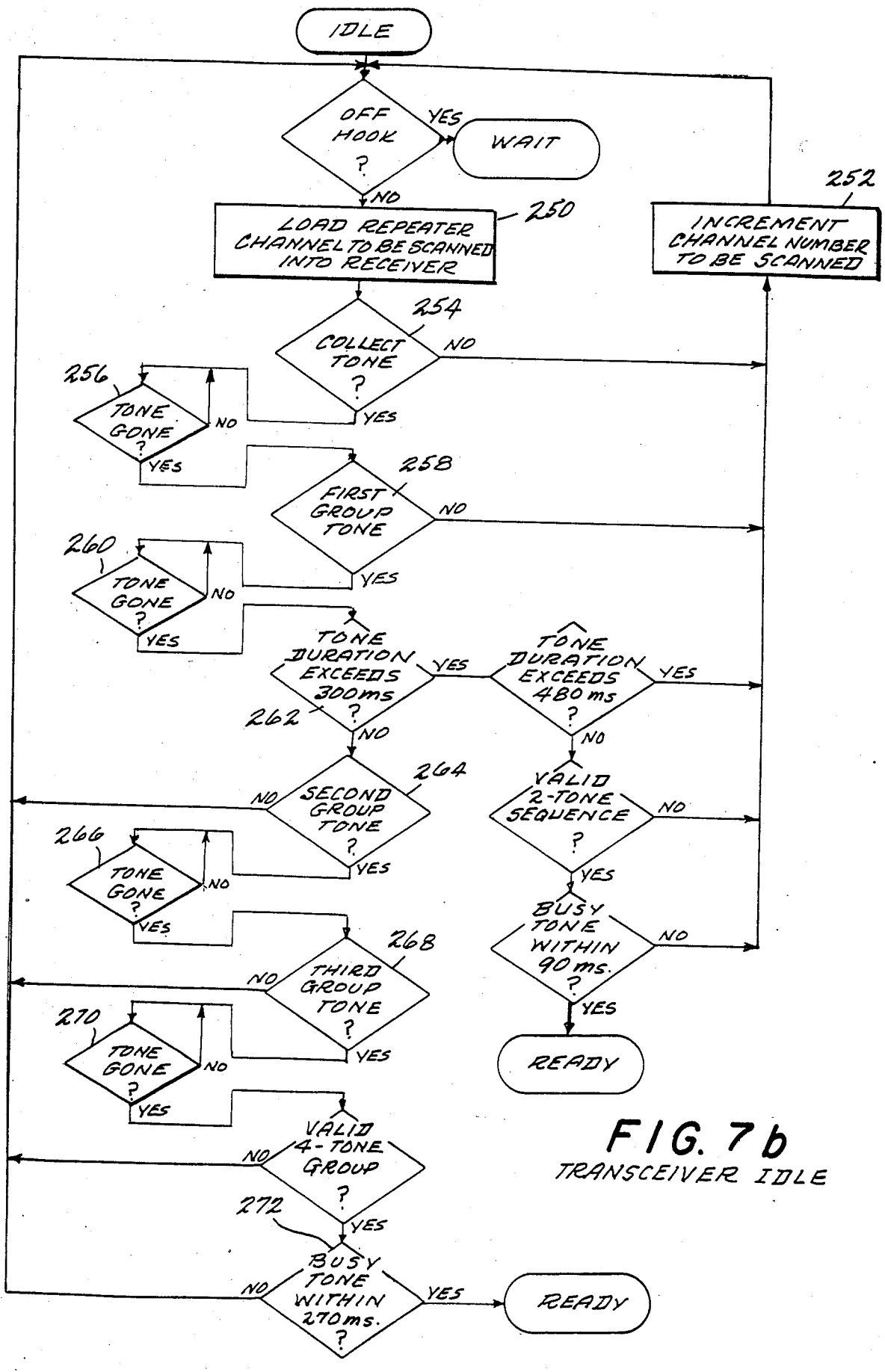
Figure 7C:
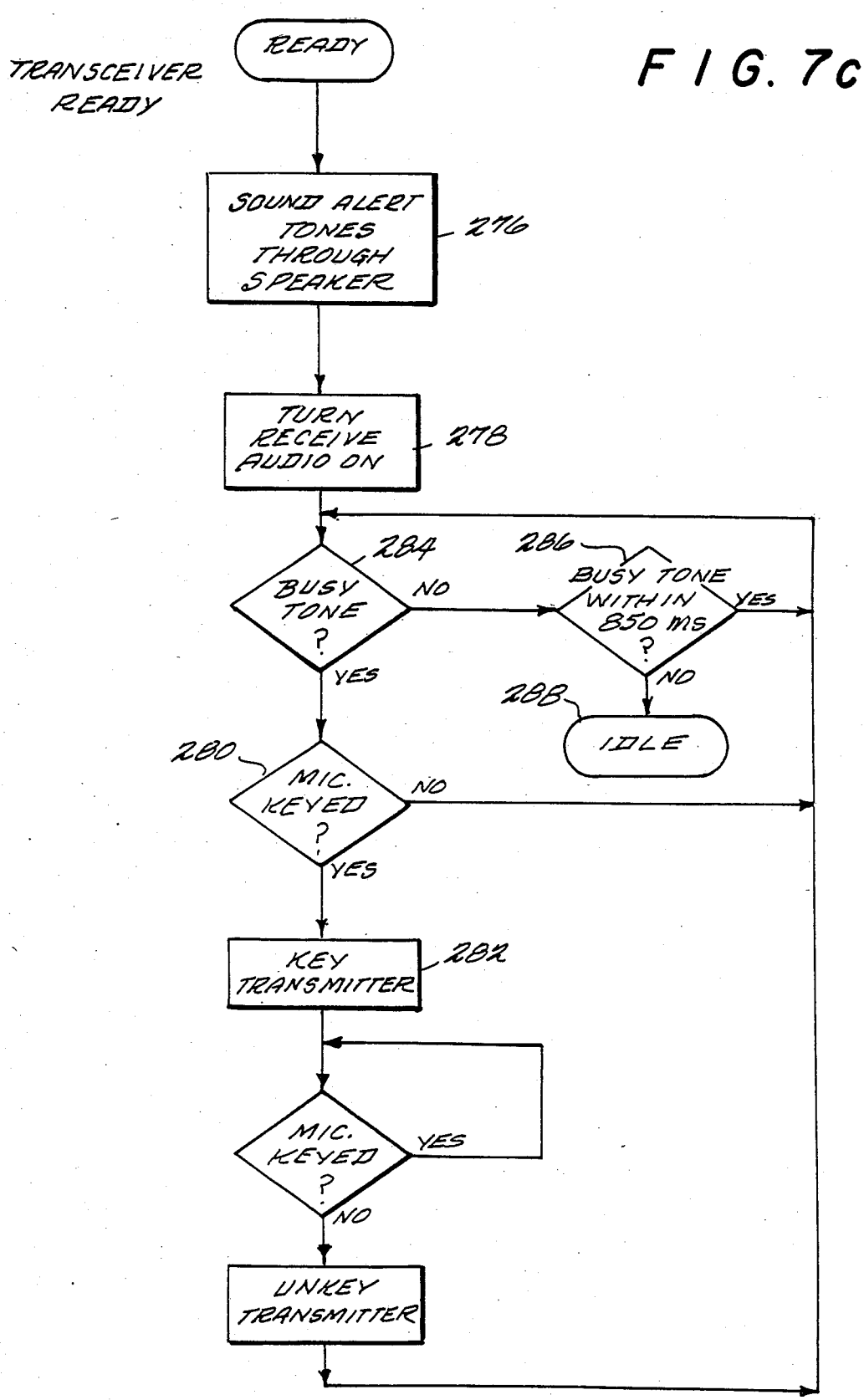

FIGS. 7b, 7c and 7d provide a more detailed flow chart of program control steps for realizing the "idle", "wait" and "ready" modes of transceiver station 50. Conventional flow chart symbols are employed which, in conjunction with the accompanying legends and discussion herein, should make these flow charts self explanatory to those skilled in the art.

When mobile station 50 is first activated, a hardware reset of all of its components places the station in the idle mode. In the idle mode, processor 58 generates control signals to cause decoder logic 62 to, in turn, cause receiver 52 and transmitter 54 to continuously scan each of the control channels described previously (F1-T through F5-T and F1-R through F5-R) at a predetermined rate. This causes the receiver 52 to sequentially tune to each of the five frequencies on which repeaters can transmit and, at the same time, causes transmitter 54 to sequentially tune to each of the five companion or associated frequencies on which the repeaters can receive (blocks 250, 252). Meanwhile, processor 58 writes at least one control word to signal processor 60 to cause the signal processor to operate in its decode mode wherein it determines if the output of A/D converter 72 corresponds to the first frequency in a pre-programmed group identifying signal sequence stored in memory 68 (block 254). If the first tone burst (signal 1) for the particular mobile station 50 is not detected on a channel, processor 58 causes the receiver and transmitter to tune to the next channel frequency (block 252). This sequence of events continues as long as receiver 52 is operable, and stops only when either mobile station 50 is turned off or receiver 52 receives the group identifying signal preprogrammed into memory 68.

If signal processor 60 detects the presence at the output of A/D converter 72 of the frequency of the first tone burst signal 1 of the group identifying signal particular to mobile station 50, it notifies processor 58 that it has received the signal it was requested to look for (such as by producing an interrupt, via I/O communication, etc.). Signal processor 60 subsequently notifies processor 58 when the first tone which it has been requested to decode has ceased being produced (block 256) (or alternatively, processor 58 can determine this information by polling the signal processor via data bus 70). Processor 58 then programs signal processor 60 to look for the next frequency tone burst signal 2 of the group identifying signal programmed into mobile station 50 (block 258). Processor 58 simultaneously stops decoder logic 62 from causing receiver 52 and transmitter 54 to scan a different channel. If the next tone received by receiver 52 has a frequency corresponding to the second tone signal 2 in the four-tone sequence preprogrammed into memory 68, signal processor 60 will so alert processor 58. Otherwise, processor 58 will assume that the next tone is not the correct one for calling mobile station 50, and will cause decoder logic 62 to resume its scanning operation as previously described.

Processor 58 thus steps signal processor 60 through all four of the frequencies of the four-tone group identifying signal to which mobile station 50 is programmed to respond (blocks 260–270). If all four tones are received, then processor 50 starts timing predetermined time $\tau_i$ (either using a software or a hardware timer) and does nothing. After time interval $\tau_i$ has elapsed, processor 58 programs signal processor 60 to decode the frequency of the busy signal (block 272). If the busy signal is present on the output of A/D converter 72, processor 58 controls mobile station 50 to go into the "ready" mode (block 274), and causes operator controls and indicators 66 to indicate that the mobile station has received a call (block 276). Processor 58 programs signal processor 60 and D/A converter 76 to route the audio output produced by receiver 52 through A/D converter 72, the signal processor 60 and the D/A converter to speaker 78 (block 278). The operator can now hear any voice transmissions present on the now dedicated channel. Signal processor 60 when operating in this mode may provide sophisticated or simple signal filtering to improve intelligibility of the audio produced by speaker 78. If a user wishes to transmit (indicated typically by depressing a button on a push-to-talk microphone 74) (block 280), processor 58 causes A/D converter 72, signal processor 60 and D/A converter 76 to route audio produced by microphone 74 to the audio input of transmitter 54 for transmission and simultaneously causes relay 65 to switch from receiver 52 to the transmitter (block 282). Of course, some of these functions can be performed by switching devices external to processor 58 if desired.

Signal processor 60 alerts processor 58 when a busy signal is no longer present on the audio output produced by receiver 52 (block 284). After a predetermined time has elapsed (to prevent mobile station 50 from dropping a channel due to deep fading) (block 286), processor 58 disables the audio to speaker 78 and resets mobile station 50 to the idle mode (block 288). Decoder logic 62 once again causes receiver 52 and transmitter 54 to scan channels in search of a call.

If a user desires to originate a call, he or she operates operator controls and indicators 66 (such as by lifting microphone 74 from a cradle or depressing the push-to-talk button on the microphone). This causes processor 58 to program signal processor 60 to search for a channel which does not have a busy signal present on it (block 290). If such a channel is found, processor 58 instructs signal processor 60 to produce a busy signal for a predetermined period of time (which is applied via D/A converter 76 to transmitter input 54) (block 292). Processor 58 then instructs signal processor 60 to decode the acquisition tone expected to be received by receiver 52 upon termination of the busy signal (block 294). If the acquisition tone is received, processor 58 once again enables transmitter 54 and causes signal processor 60 to transmit each of the four tone bursts signal 1-signal 4 of the group identifying signal of mobile station 50 for 90 milliseconds each (block 296).

Upon the conclusion of the last one of the four tone bursts (signal 4), processor 58 may either cause a predetermined time delay, or may alternatively program signal processor 60 to decode each one of the four tones regenerated by the repeater to ensure that the repeater has accurately initiated a signalling sequence (block 298, 300). At the proper time, processor 58 will program signal processor 60 to decode a busy tone received by receiver 52 (block 302). If the busy tone is successfully received, processor 58 causes mobile station 50 to enter the "ready" mode and permits transmission of audio from microphone 74 and routes audio output from receiver 52 to loudspeaker 78 as previously described.

Figure 8:
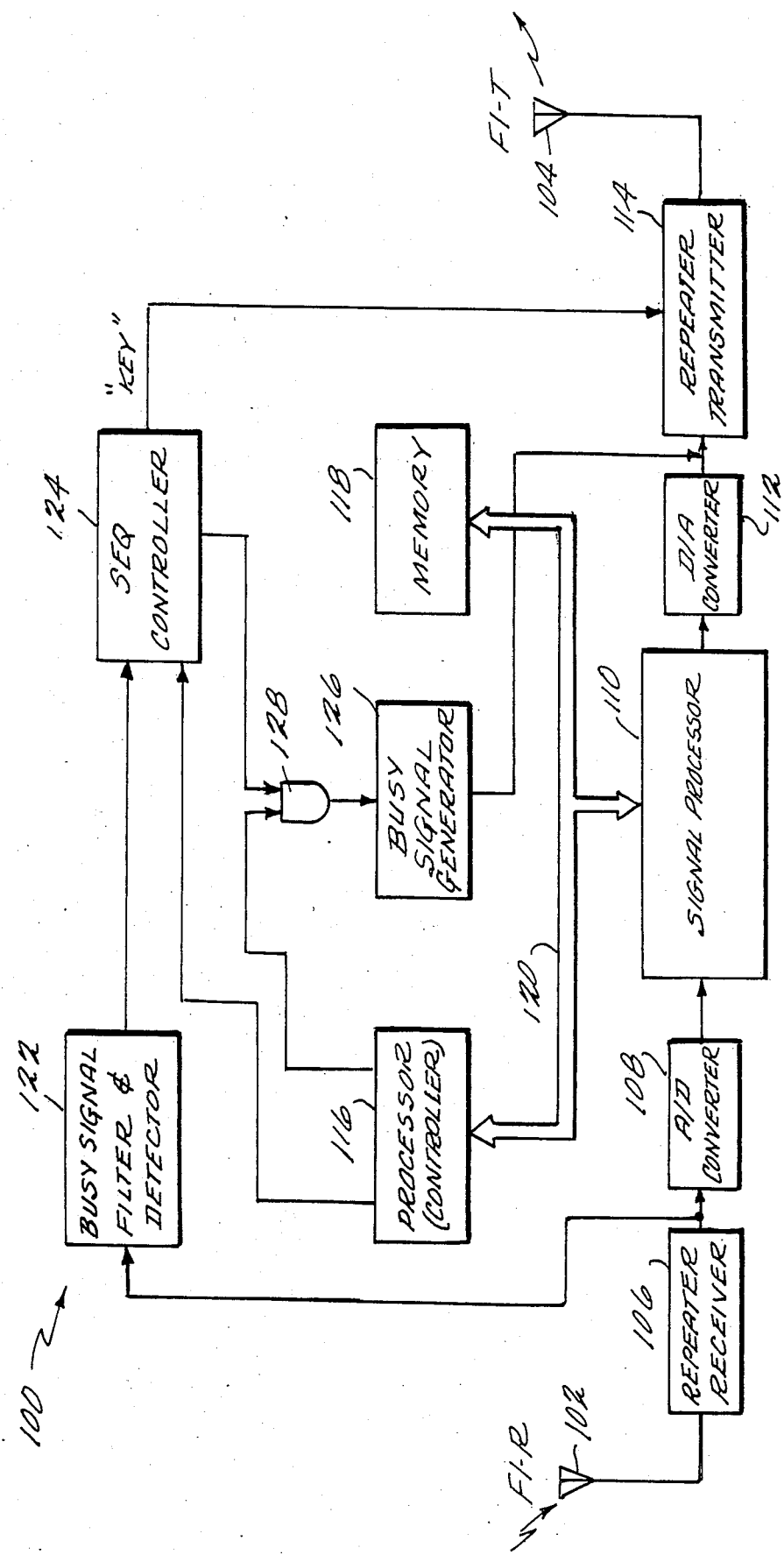
FIG. 8 is a block diagram of an exemplary repeater station in accordance with the present invention.

FIG. 8 is a block diagram of one of the repeaters shown in FIG. 2 for use with the trunking system according to the present invention. In this repeater (designated by numeral 100 for convenience), an antenna 102 is used for receiving a particular frequency of signals transmitted by the mobile stations (for example F1-R). Another antenna 104 is used to transmit radio frequency information on a channel frequency F1-T (the companion channel frequency to F1-R). In the preferred embodiment, repeater 100 is capable of operating in the full duplex mode (i.e. it can receive a signal on F1-R and transmit a signal on F1-T simultaneously). Companion channel frequencies F1-R and F1-T are separated in frequency by a sufficient frequency spacing to provide isolation between input and output frequencies in a well-known manner. Of course, repeater 100 may be operated using a single antenna (or all of repeaters R-1 through R-5 may be operated on the same antenna) if proper filtering networks are used.

Receiving antenna 102 is coupled to the input of a repeater receiver 106 conventional in design which receives and demodulates the information carried by signals transmitted on channel F1-R. The output of repeater receiver 106 is coupled to an A/D converter 108 which digitizes the output in a conventional fashion.

The digitized output produced by A/D converter 108 is applied to an input of a signal processor 110. The output of signal processor 110 is connected to the input of a D/A converter 112 which converts the digital output of the signal processor to an analog signal and applies it to the input of a repeater transmitter 114. Repeater transmitter 114 produces a radio frequency carrier modulated by the audio information applied to its input, and applies the modulated carrier to transmitting antenna 104.

Signal processor 110 is connected to a controller processor 116 and a memory 118 via a bidirectional data bus 120. Signal processor 110 in the preferred embodiment comprises the same device (a NEC 7720) used for signal processor 60 shown in FIG. 7; likewise, processor 116 comprises a standard Intel microprocessor chip, and memory 118 comprises a conventional memory device. Processor 116, memory 118 and signal processor 110 communicate via data bus 120 in precisely the same manner as described previously with respect to processor 58, memory 68 and signal processor 60 described in connection with FIG. 7.

Signal processor 110 of repeater 100 is used to generate tones and to digitally filter (and otherwise process) the output of repeater receiver 106. Signal processor 110 can produce a tone and process an audio signal simultaneously.

The output of repeater receiver 106 is also connected to the input of a busy signal filter and detector 122. Busy signal filter and detector 122 is preferably a bandpass filter (or conventional tone decoder) which produces an output when a busy signal is present on the output of repeater receiver 106. The output of busy signal filter and detector 122 is applied to the input of a sequential controller block 124 the function of which is to control the other blocks of repeater 100 (in particular, transmitter 114 and a busy signal generator 126) along with processor 116. Sequential controller 124 produces an output ('KEY') which causes repeater transmitter 114 to begin transmitting a carrier. Sequential controller 124 provides another output which is applied to one of the two inputs of a two-input AND gate 128. The other input of AND gate 128 is connected to an output of processor 116. The output of AND gate enables a busy signal generator 126 (a conventional audio oscillator which produces a busy signal). The output of busy signal generator 126 is connected to the audio input of repeater transmitter 114 along with the output of D/A converter 112.

Sequential controller 124 produces the "KEY" signal at the beginning of and as long as a busy signal is detected by busy signal filter and detector 122, and for a selected period of time (for example 1 second) after termination of the busy signal. This "KEY" enabling or keying signal enables repeater transmitter 114. When the enabling signal ends, repeater transmitter 114 is turned off automatically, thereby conserving the life of the output stages of the repeater transmitter (as well as conserving power and complying with the rules of the Federal Communications Commission). Sequential controller 124 permits a repeater to become available to another subsequent group if transmissions by a group to which the repeater channel had been dedicated do not occur within a predetermined span of time (for example, every 10 seconds), thus "timing out" repeater 100.

When repeater receiver 106 (which is always enabled) receives a busy signal, sequential controller 124 causes repeater transmitter 114 to become enabled (thereby generating a carrier). Simultaneously to this occurrence, signal processor 110 (which had been previously programmed by processor 116 to decode the busy signal) may alert processor 116 that a busy signal is present. Processor 116 then programs signal processor 110 to produce an acquisition tone for a predetermined period of time; this acquisition tone is converted to audio information by D/A converter 112 and transmitted by repeater transmitter 114. Also at the same time, processor 116 and sequential controller 124 cause Busy Signal Generator 126 to produce a busy signal which is transmitted along with the acquisition tone.

If a first tone burst is received by repeater receiver 106, signal processor 110 provides information to processor 116 concerning the presence and frequency of the received tone burst. Processor 116 monitors the output of signal processor 110 to determine when the tone burst being received stops and a tone burst of a different frequency begins. If the tone burst being received has a duration of greater than approximately 90 milliseconds (i.e. about 450 ms), processor 116 can determine that it is receiving a signalling sequence transmitted by a two-tone type mobile station, and therefore instructs signal processor 110 to look for only one more tone. However, if the first tone burst received by repeater 100 lasts for only about 90 milliseconds, processor 116 knows that it may be receiving the signalling sequence transmitted by a four-tone mobile station, and therefore must determine if a two or four tone sequence is being received.

Processor 116 monitors the output produced by signal processor 110 to determine the frequency of each successive tone received after the first tone. At the same time, processor 116 programs signal processor 110 to begin regenerating the tone bursts received and already decoded. Each of the regenerated tone bursts has a duration of a predetermined period of time (preferably about 180 milliseconds although tone signal 1 is sent for a longer period to allow a scanning mobile station time to receive it). Processor 116 may store information about tones already received either in memory 118 or in internal registers (not shown). Hence, repeater 100 can be decoding the second or successive tones of a received signalling sequence while simultaneously regenerating the same signalling sequence (delayed in time). The regenerated signalling sequence is transmitted by transmitter 114 to call other stations in the group to which the signalling sequence corresponds.

If the first tone burst received by repeater 100 has a duration of greater than 90 milliseconds (indicating a two-tone signalling sequence), processor 116 controls Busy Signal Generator 126 via AND gate 128 to continue to produce the busy tone. After the second tone in the two-tone signalling sequence is produced, processor 116 waits a predetermined period of time (preferably about 90 milliseconds) and then controls signal processor 110 to begin processing the audio output of repeater receiver 106. Signal processor 110 may perform a variety of filtering functions on the receiver audio output, including removing any busy tone component from the audio output to prevent retransmission of a received busy signal. The output of signal processor 110 is connected to the input of repeater transmitter 114 so that the repeater 100 repeats (retransmits) information present on the output of repeater receiver 106.

If processor 116 determines that the first and second tone bursts have durations of only about 90 milliseconds (or otherwise determines that a four-tone signalling sequence is in progress, such as by counting the number of tones it has received so far), the processor 116 disables Busy Signal Generator 126 (via gate 126), thereby stopping the busy signal from being produced for the remainder of the signalling sequence. Processor 116 controls signal processor 110 to produce each of the tone bursts in the four-tone signalling sequence for a predetermined period of time (180 milliseconds in the preferred embodiment although tone signal 1 (the "collect" tone) is sent for a longer period to allow a scanning mobile station time to receive it) despite the fact that the received tone bursts each have a duration of substantially less than this predetermined period. When the transmission of the fourth tone is completed, processor 116 turns off signal processor 110 for a predetermined time (about 180 milliseconds in the preferred embodiment) and simply waits. Processor 116 then reenables Busy Signal Generator 126 to once again begin producing the busy signal, and programs signal processor 110 to process the output of repeater receiver 106 (as described above) to place repeater 100 in a repeating mode.

It will be understood that the functions of busy signal filter and detector 122, sequential controller 124, busy signal generator 126 and AND gate 128 could all be performed by processor 116, memory 118 and signal processor 110. In the preferred embodiment, busy signal filter and detector 122, sequential controller 124 and busy signal generator 126 are of the type described in U.S. Pat. No. 4,360,927 to Bowen et al to permit existing hardware to be used rather than discarded. Of course, it might be desirable to eliminate blocks 122, 124, 126 and 128 and have processor 116, memory 118 and signal processor 110 take over the functions of these blocks if there was no reason to adapt existing hardware (such as in the case of newly-manufactured repeaters 100).

Although the required programming of the repeater 100 should now be apparent (in view of the detailed functional descriptions already provided above), FIGS. 8a, 8b, 8c, 8d depict in more detail one exemplary embodiment of suitable controlling programs.

When a mobile first attempts to acquire an unused channel, the mobile transmits a 90 msec burst of busy tone on the channel. Repeater hardware detector 122 detects the busy tone, and activates the repeater transmitter to send an acquisition tone burst on the channel. It also alerts the microprocessor 116 in the repeater that an incoming two- or four-tone sequence is expected.

Repeater tone detection and tone regeneration is, in effect, carried out simultaneously. This is accomplished by using a signal processor 110 to detect and regenerate the tones under control of the 8031 microprocessor 116. The 8031 has internal timers, one of which is used as a 5 millisecond internal interrupt. In this 5 msec interrupt routine, the microprocessor updates the current states of detection and regeneration programmed routines.

FIG. 8a flowcharts the setup routine once the microprocessor 116 has been alerted to the fact that a tone sequence is expected from a mobile. The buffer to hold the detected tones is cleared, a timer is set up so the microprocessor does not look indefinitely for the tone, a bit is set which indicates that tone detection is being performed, and the 5 millisecond interrupt is enabled. Note that all timeout timers used during this process are based on the 5 millisecond interrupt. Therefore, for example, if one knows that one should get the first tone of a sequence from the mobile no longer than 200 milliseconds after acquisition tone has been sent from the repeater, a 200 msec timeout is achieved by loading "40" into a counter and decrementing it every time the 5 msec interrupt is encountered.

FIG. 8b flowcharts the 5 msec interrupt handler routine. If detection of the tone sequence is being performed, then the tone detection routine is called. Finally, if regeneration of the tone sequence is in progress then the tone regeneration routine is called.

FIGS. 8c and 8d outline tone detection and tone regeneration routines respectively. These are a combination of a flow chart and a state diagram. The ovals represent states in which the routines can reside. When called from the 5 msec routine, execution enters the state the routine was in when it exited from the last 5 msec interrupt. A decision is made as to what the new state should be and the flow chart is executed as the states are changed. Once the new state is entered, program execution returns from the routine to the 5 msec routine (note that the new state could equal the old state).

In FIG. 8c the software immediately leaves the "start" state and begins looking for the first tone to come from the mobile. The routine enters this state following every 5 msec interrupt until either a tone is detected or until it times out. If it times out, the repeater is taken off the air, tone detection and tone regeneration are terminated and the process is complete. If a tone is detected, however, then the second "look for tone" state is entered following every 5 msec interrupt. This will continue to happen until a timeout occurs or until a new tone is detected. If a new tone is detected then it is stored in the buffer and the second "look for tone" state remains the current state. If however four tones have been detected then the tone sequence detection operation is complete, the process is disabled and the microprocessor 116 may itself validate the tone sequence or it may request validation of the tone sequence from the site controller (e.g. an overall repeater site control computer, not shown). If a timeout occurs while in this state, then the operation is complete and one of two things happen: either one tone was detected and therefore the received sequence is obviously incorrect, or two or more tones were received so the repeater is allowed to remain on the air. Validation may be requested for the tone sequence even if 0 or 1 tones were received so the site controller can log the occurrence. The repeater may be disabled prior to the invalid signal from the site controller in order to maximize usable repeater time.

Note that the implementation outlined above does not preclude 3 tone signalling or more (simply exit on 5 or 6 tones received instead of 4).

In FIG. 8d the tone regeneration process is outlined. Notice that tone regeneration begins immediately because one knows at least the first tone has been received. (This routine is not enabled until the tone detection routine detects a tone and then enables the regeneration routine.) This first tone is the collect tone and the routine remains in this regeneration state for 360 msec (72 passes through the 5 msec routine). At this point a new state is entered—a first state is entered if a second tone has not yet been detected by the tone detection routine (FIG. 8c). In this state the routine checks upon each call (every 5 msec) to see if the second tone has been received. If it has, then the first state is exited (basically the program generates the collect tone for the same length of time that the mobile sent it). The second state the routine can enter after the 360 msec timeout is the main tone regeneration state (middle of FIG. 8d).

Before it enters the second state, the timeout is set to the remainder of the system collect tone duration. This state can only be exited by a timeout. Upon timing out on the tone being generated, the program reads in the next tone from the buffer. If it is zero (no tone detected) then the regeneration process is complete and is therefore disabled. If another tone should be generated, then the main tone generation state is re-entered. The program gets there, however, through one of two different paths. If more than 2 tones have been detected then the timeout is set to that used for four-tone groups (180 msec is the preferred implementation) whereas if only 2 tones have been detected then the timeout is set to that used for two-tone group.

Muting of the busy tone is initiated (as shown in FIG. 8d) about half-way through regeneration of the second regenerated tone burst. Such suppression is then disabled (i.e. "reset") and the busy signal is once again transmitted after a $\tau_3$ timeout entered just prior to exit from from the tone regeneration routine of FIG. 8d.

Figure 9:
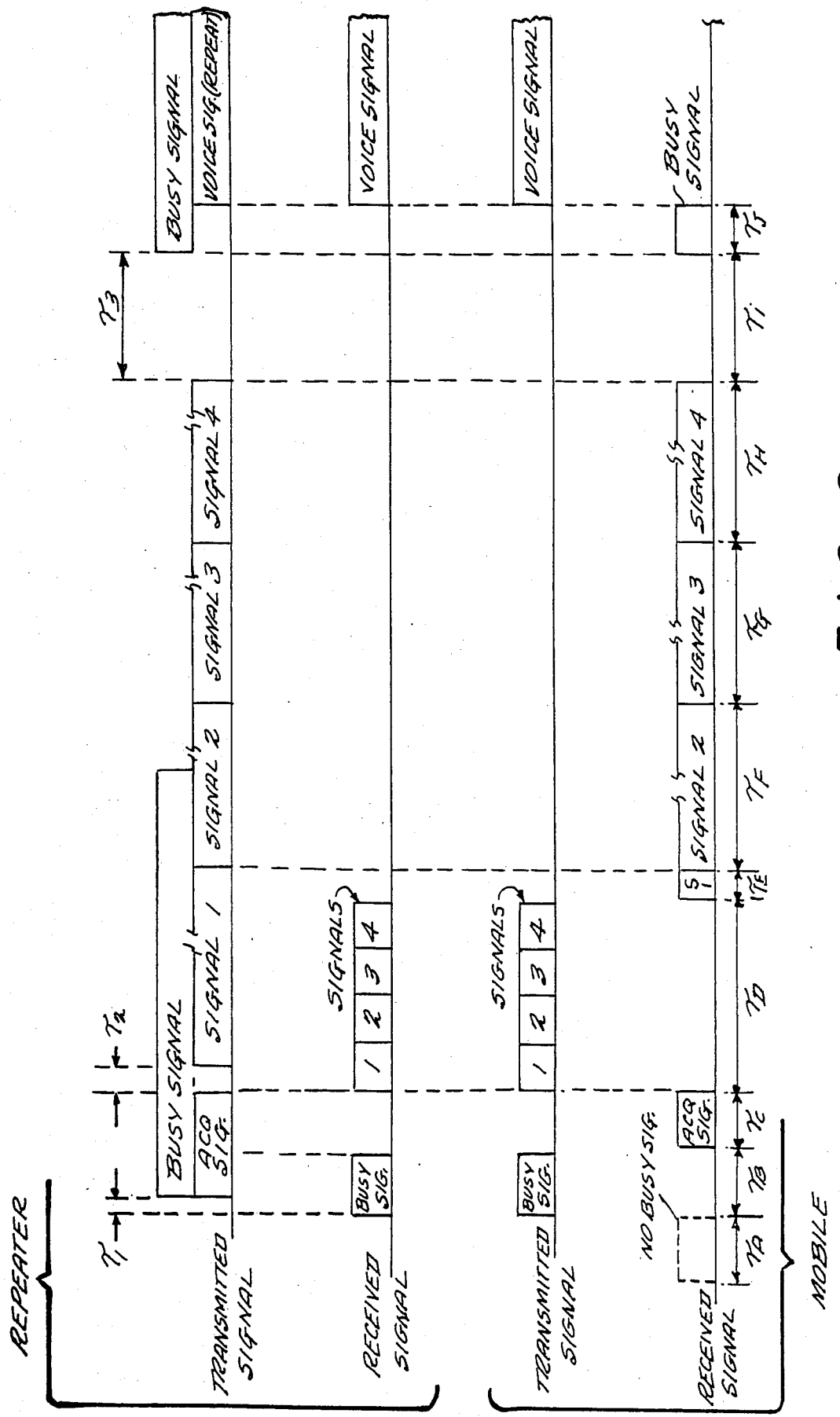
FIG. 9 is a graphical illustration of the signalling sequence shown in FIG. 3 wherein the duration of the busy signal is further extended into the channel acquisition signalling sequence protocol before being interrupted so as to further minimize transceiver falsing.

The time during which the busy signal is suppressed is a time when scanning transceivers may erroneously try to acquire that channel. It is also a time during which some existing transceivers may begin a timed "dropout" period (e.g. to drop the existing channel assignment if busy signal is absent for more than some period such as 650 ms). And some dispatcher overdial procedures might cause mobile dropouts due to lack of busy signal on the channel. Accordingly, to minimize such possible problems and yet retain the advantages obtained by temporary busy signal suppression, the presently preferred embodiment minimizes the vulnerable time period as depicted in FIG. 9. Here the busy signal is maintained by the repeater through about half of the regenerated transmission of S2. This may, for example, reduce the duration of busy tone suppression from 720 to 630 ms (in one embodiment) while yet insuring that busy tone will be absent when desired to eliminate falsing by any two-tone transceivers then active in the system.

The system which has been described provides compatibility between mobile stations using the prior art two-tone signalling format and mobile stations using the new expanded four-tone signalling format while simultaneously helping to prevent undesirable "falsing". The preferred embodiment also provides compatibility between mobile stations using the same signalling format (i.e. two-tone or four-tone) but requiring signalling tones of different lengths. As mentioned previously, mobile stations not actually engaged in communications (i.e. those in the "idle" mode) continuously scan or cycle through the plural available channels of the system searching for an active repeater channel upon which is being transmitted the initial assigned group signalling tone. When a mobile station is in this scanning (search) mode, it "listens" on each non-dedicated channel in a predetermined sequence of channels for a period just long enough to determine whether the channel is both active and is carrying a predetermined initial signalling tone (i.e. signal 1 or group tone) for which the mobile station is programmed to be sensitive. If the channel to which the mobile station is tuned is inactive or if it is active but is not carrying the mobile station's predetermined initial signalling tone, the mobile station leaves the channel and listens to the next non-busy channel in the predetermined sequence. In this way, mobile stations constantly cycle through a predetermined plurality of channels, waiting to receive incoming calls.

When a mobile station does detect its initial signalling tone, it stops scanning, and remains on the thus detected channel until signals in the called-station signalling format or protocol following the initial signal are transmitted. If these later-transmitted tone(s) also correspond to the mobile station's assigned sub-group tones, the mobile station continues to remain on the selected channel, alerts the operator that a call has been received (as described previously), and becomes involved with the voice communication occurring on the channel. Hence, the initially detected signalling tone of both the two-tone and four-tone signalling formats functions to attract or "collect" appropriate ones of the mobile stations scanning the plural channels of the system onto the particular channel being dedicated. This initial tone (which corresponds to the "signal 1" tone shown in FIG. 3 and corresponds to the "group signal" tone shown in FIG. 1) may be generally termed a "collect signal" since it functions to "collect" onto the channel the mobile stations being called.

Once mobile stations have been called onto the channel being dedicated, they remain there either until the communication is complete or until they determine (by signals transmitted after the collect signal) that they are not being summoned (i.e. if signals transmitted after the collect signal do not have the characteristics the mobile stations have been programmed to recognize).

Hence, the second signal in the two-tone signalling format and the last three signals in the four-tone signalling format need only be of a duration sufficient to permit mobile stations to reliably decode the signals. State of the art microprocessor-controlled mobile stations using programmable tone decoders (such as signal processor 60 shown in FIG. 7) are capable of decoding signals very rapidly (on the order of 50–60 milliseconds or less in the preferred embodiment). However, older mobile stations may require a longer time to decode the signalling tones. It is for this reason that the repeater in the preferred embodiment transmits the second signal of the two-tone signalling format and the last three signals of the four-tone signalling format each for a duration of about 450 milliseconds or 180 milliseconds, respectively. This duration could, of course, be shortened to the longest duration needed to permit each of the mobile stations supported by the system to reliably detect and decode the called-station identifying signals.

The duration of the collect signal, however, is related to the number of channels used by the system and/or the channel scanning speed. The collect signal must be long enough to permit each mobile station to scan all of the channels assigned to the mobile station regardless of the order of the channel being dedicated in the scanning sequence. For example, the mobile station may have left the channel transmitting its assigned collect tone just before the signalling sequence was initiated on a given channel and thus must cycle through the remainder of all its assigned channels before returning to the active calling channel. Such a calling signal protocol must also be operative regardless of the initial time of arrival of a given mobile station on the channel to listen for its assigned collect signal (since the mobile stations in the preferred embodiment are not synchronized with one another or with the repeater during scanning). Hence, the duration of the collect signal in the preferred embodiment is a function of the time a mobile station in the system listens on each channel while scanning, and the number of channels scanned by the mobile station supported by the system having the longest scanning sequence (i.e. scanning the most channels) which is to be signalled.

In the presently preferred exemplary embodiment, each mobile station during scanning remains on a channel for approximately 90 milliseconds to listen for its collect signal, and then moves on to the next channel in its scanning sequence (this 90 millisecond duration is arbitrary, and may be set to any value consistent with compatibility with existing equipment which is long enough to ensure reliable tone detection). However, different mobile stations in the system may scan a different number of channels. For instance, some mobile stations may only scan three or five channels in the preferred embodiment, while a dispatch base station may need to scan all of the channels in the system (e.g. 20 channels) to permit access to all of the groups and subgroups of mobile stations of the system.

In the preferred embodiment, the duration of the collect signal $\tau_{collect}$ transmitted by the repeater is given by the following equation:

$$\tau_{collect} = \tau_{scan} \cdot (n+1)$$

where $\tau_{scan}$ is the length of time a mobile station remains on each channel during scanning (90 milliseconds in the preferred embodiment) and n is the number of channels being scanned by the mobile station scanning the largest number of channels which is to be signalled. The last term in the equation above is $(n+1)$ instead of $(n)$ to account for the fact that mobile stations are not synchronized with one another or with the repeater. Hence, the duration of the collect tone for a five channel system (i.e. a system wherein all of the mobile stations scan five channels or less) is 540 milliseconds in the preferred embodiment, as described previously. Likewise, the collect tone durations of a three-channel and a twenty-channel system are, respectively, 360 milliseconds and 1890 milliseconds.

It may be desirable to permit mobile stations scanning different numbers of channels to contact one another. For instance, to insure complete compatibility, it may be desirable to permit a mobile station which scans three channels to contact a mobile station scanning twenty channels. In the preferred embodiment, the collect signal duration required by a three-channel mobile station is 360 milliseconds, while the collect signal duration of a mobile station scanning 20 channels is 1890 milliseconds. To ensure compatibility between three-channel and twenty-channel mobile stations, the collect signal transmitted by the repeater must correspond to the length necessary to collect mobile stations scanning twenty channels, since the repeater in the preferred embodiment has no way of determining, during channel acquisition signalling, the number of channels scanned by the various mobile stations it is trying to collect (all simultaneously addressed mobile stations are, of course, assumed to be using the same signalling format). Hence, in the signalling protocol shown in FIG. 3, signal 1 is preferably regenerated by the repeater for a predetermined duration of time which corresponds to the longest collect signal duration needed by any mobile station supported by the system.

Although this feature insures complete compatibility between all of the stations in the system, it also may increase access time because the longest collect signal duration is used whether or not it is actually needed.

For instance, if the system includes mobile stations scanning three channels and mobile stations scanning twenty channels, the repeater transmits collect tones of a duration corresponding to twenty-channel mobile stations even when a three-channel mobile station is calling another three-channel mobile station. Access time thus may be increased significantly (in the preferred embodiment, 1.5 seconds for each attempt to dedicate a channel). This longer access time is fully justified if it is necessary for any mobile station of the system to call any other mobile station. However, it is often not necessary to provide this flexibility, since (depending upon system configuration) it may be that no communication is needed between mobile stations scanning different numbers of channels. In accordance with another embodiment of the present invention, mobile stations are permitted, under some circumstances, to control the duration of the collect tone transmitted by the repeater in order to reduce access time.

Figure 10:
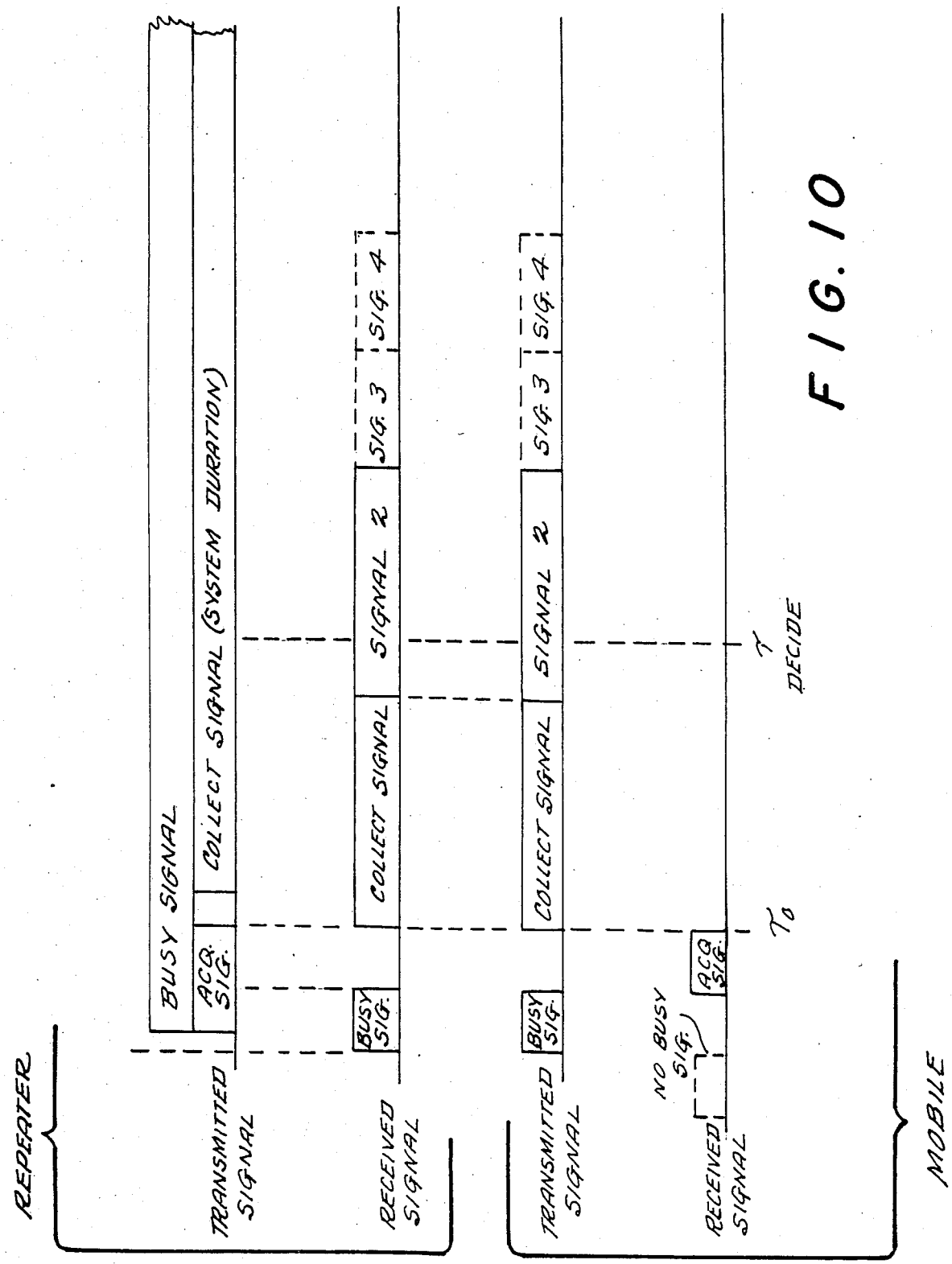
FIG. 10 is a graphical illustration of the generation of a collect signal in one type of channel acquisition protocol in accordance with the present invention.

FIG. 10 is a graphical illustration (at an expanded scale) of the collect signal generation of the embodiment described previously (FIG. 3). Upon receiving the collect signal transmitted by either a two-tone or a four-tone mobile station, the repeater regenerates a collect tone for a predetermined period of time corresponding to the longest scanning cycle time of the mobile stations on the repeater (for instance, 540 milliseconds for a five-channel system in the preferred embodiment). After this predetermined duration has elapsed, the repeater determines whether the signalling transaction with which it is cooperating is in the two-tone or in the four-tone signalling format. This determination may be made by counting the number of tones received (since for a four-tone signalling format, all four tones will have been received by the time the collect tone transmission is complete), or by determining the duration of the second (or another) tone in the signalling sequence (which will be about 90 milliseconds in the preferred embodiment for the four-tone signalling format and substantially greater than 90 milliseconds for the two-tone signalling format). The repeater then regenerates the signalling tones subsequent to the collect signal as described previously.

Figure 11:
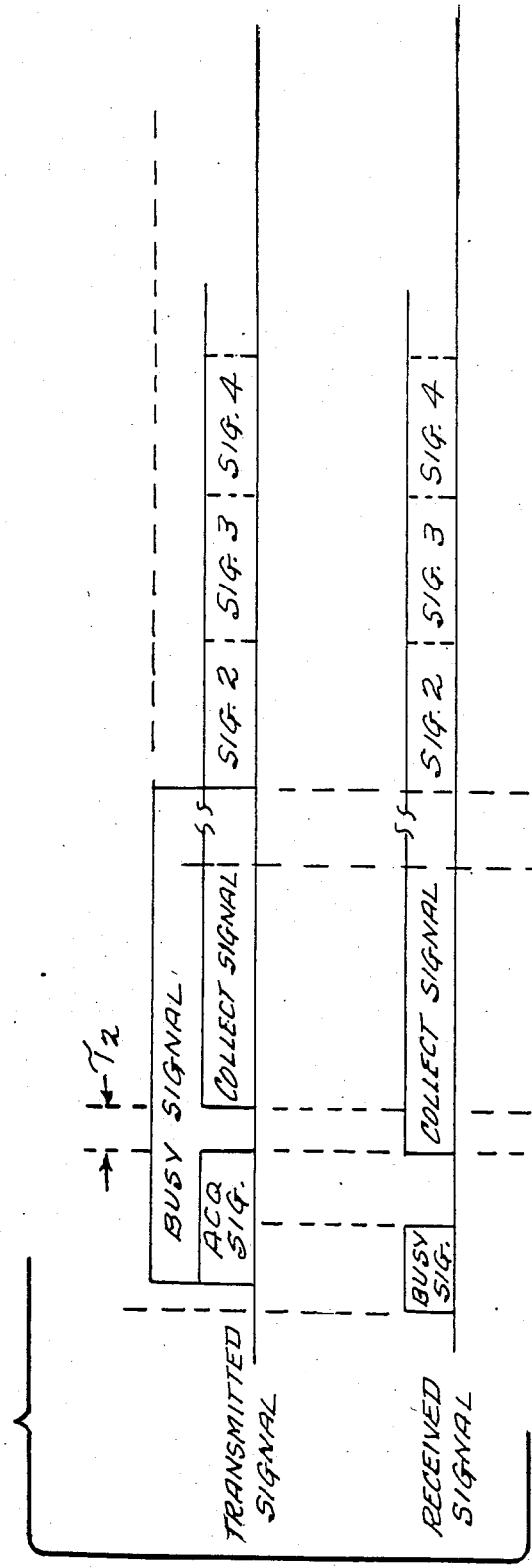
FIG. 11 is a graphical illustration of the generation of another type of collect signal in the exemplary channel acquisition protocol embodiment.
Figure 11:
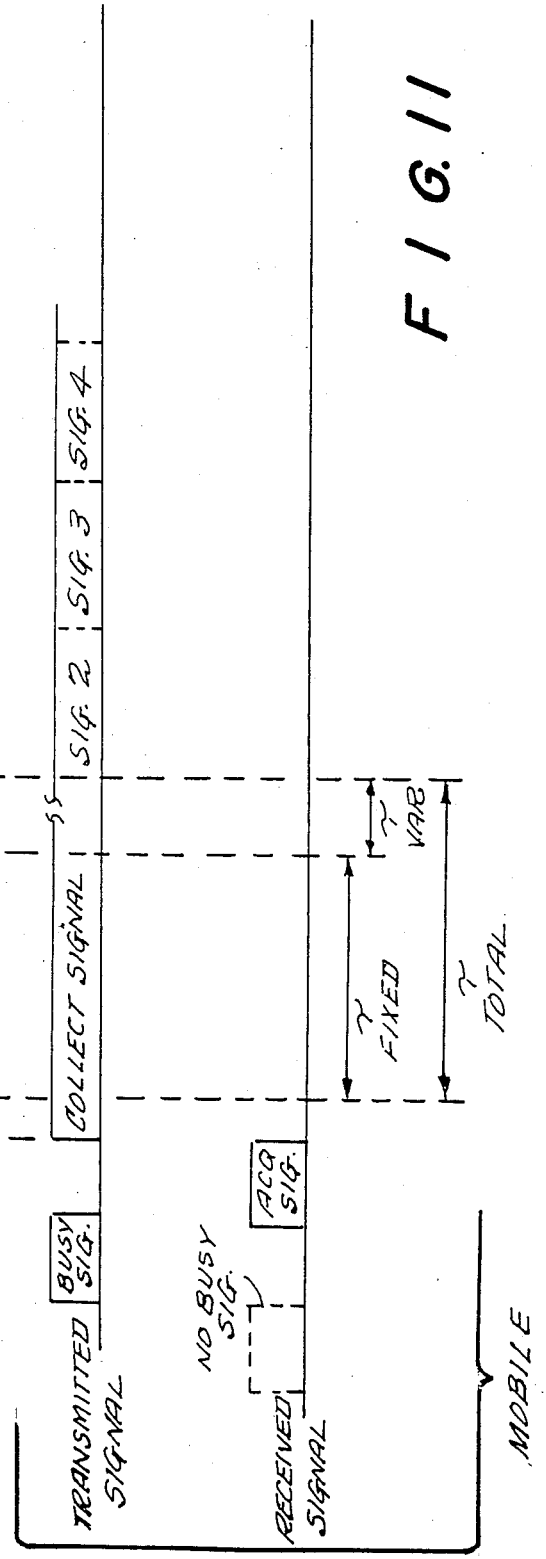
Figure 12:
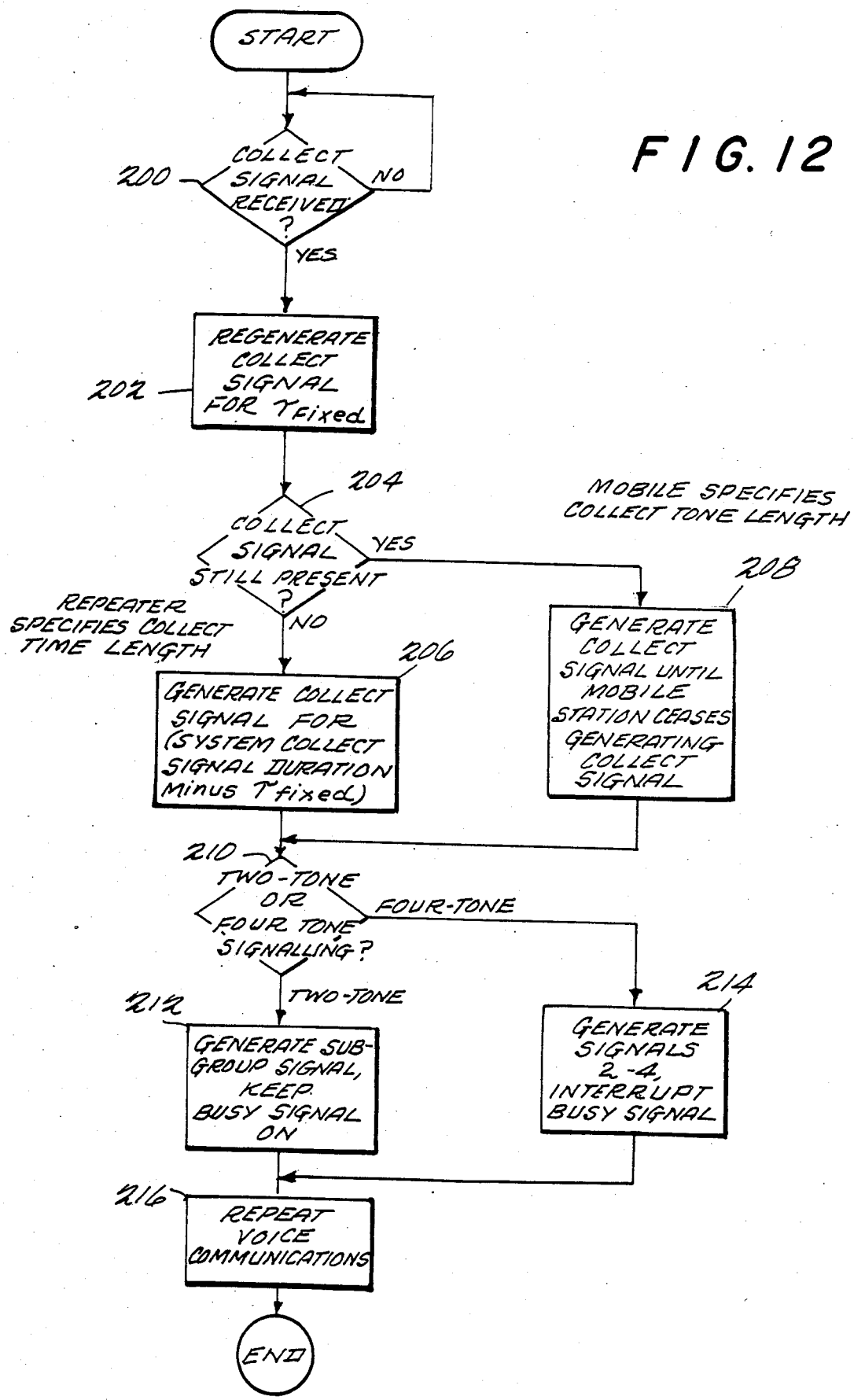
FIG. 12 is an explicit repeater control program flow chart of the signal processing steps performed by an exemplary repeater embodiment for which the signalling sequences are shown in FIG. 11.

FIG. 11 is a graphical illustration (at the same expanded scale as FIG. 10) of the collect signal generation of another embodiment of the present invention, wherein mobile stations are permitted to specify the duration of the collect signal transmitted by the repeater. FIG. 12 is a flow chart of programmed signal processing steps specified by software stored in memory 118 shown in FIG. 8 to implement this feature. In this embodiment, the repeater transmits the collect tone for a duration $\tau_{total}$ which is equal to the sum of a fixed duration $\tau_{fixed}$ and a variable duration $\tau_{var}$. In the preferred embodiment, the fixed duration $\tau_{fixed}$ is equal to the collect signal duration required by mobile stations supported by the system which scan the smallest number of channels (for instance 360 milliseconds in the preferred embodiment for a system supporting three-channel mobile stations) to prevent the repeater from ever transmitting a collect signal of duration less than this minimum duration. The duration $\tau_{var}$ depends upon the length of the collect signal received by the repeater (i.e. transmitted by the calling mobile station), and may be one of a length specified by the mobile station itself or a length specified by the repeater.

When the repeater receives a collect signal from a mobile station (block 200 shown in FIG. 12), it begins regenerating the collect signal for a duration $\tau_{fixed}$ (after a time for detection $\tau_2$) (block 202). After transmitting the collect tone for the first duration $\tau_{fixed}$, the repeater examines the signals it receives to determine whether the calling mobile station stopped transmitting a collect signal prior to that time (block 204). If the mobile station has completed transmitting its collect signal prior to the time $\tau_{fixed}$ elapses, the repeater sets the duration $\tau_{var}$ to a fixed value specified in the repeater as the standard system duration and continues to transmit the collect signal for the additional duration $\tau_{var}$ in order to make the total duration of the collect signal correspond to the requirements of mobile stations on the system scanning the largest number of channels (block 206) (e.g. $\tau_{var}$ is set to 180 milliseconds for a five-channel system in the preferred embodiment so that the total duration of the collect signal is 540 milliseconds, as described previously). Hence, when a mobile station transmits a collect signal for a duration less than $\tau_{fixed}$, the repeater specifies the collect signal duration as the standard system duration, and the length of the collect signal corresponds to that described previously in connection with FIG. 3.

On the other hand, if the mobile station transmits a collect signal which has a duration greater than (or equal to) $\tau_{fixed}$ (plus the detect time $\tau_2$), the repeater determines that the collect signal transmitted by the mobile did not cease prior to the time $\tau_{fixed}$ elapsed (block 204). In this case, $\tau_{var}$ is determined directly by the duration of the collect signal transmitted by the calling mobile station (block 208). In the preferred embodiment, the repeater continues to regenerate the collect signal, and periodically (e.g. every 5 milliseconds) determines whether the mobile station has ceased transmitting the collect signal. If the mobile station has not ceased transmitting the collect signal, the repeater continues to regenerate the collect signal for another 5 milliseconds and checks once again to see if the mobile station is still transmitting the collect signal. When the calling mobile station does cease transmitting the collect signal, the repeater likewise ceases transmitting the collect signal, determines whether the calling mobile station uses the two-tone or the four-tone signalling format (in the manner described previously as depicted at block 210), and regenerates the signals transmitted by the calling mobile station subsequent to the collect signal (blocks 212, 214). In this way, the repeater "tracks" the collect signal transmitted by the calling mobile station whenever the calling mobile station transmits a collect signal which is not less than a predetermined duration $\tau_{fixed}$. If the collect tone transmitted by a calling mobile station has a duration shorter than this predetermined duration, the repeater itself specifies the duration of the collect signal as the system default value.

Unlike the signalling described in connection with FIG. 3, the signalling shown in FIG. 11 does not guarantee that all mobile stations supported by the system can decode every signalling transaction transmitted by the repeater. For instance, suppose a mobile station scanning five channels (and thus requiring a minimum collect tone of duration of 540 milliseconds) transmits a collect tone having a duration of 540 milliseconds. Assuming $\tau_{fixed}=360$ milliseconds, the mobile station transmits a collect signal having a duration which is longer than $\tau_{fixed}$. Therefore, the repeater regenerates the collect signal with a duration approximately equal to that of the duration of the collect signal transmitted by the mobile station (i.e. 540 milliseconds), The duration of the collect signal transmitted by the repeater is long enough to collect all mobile stations scanning five channels or less which are programmed to correspond to the particular collect signal transmitted. However, the duration of the collect signal transmitted by the repeater is not long enough to collect mobile stations scanning more than five channels (e.g. twenty channel mobiles), so that the calling mobile station is now not capable of calling such other mobile stations.

If the calling mobile station never needs to communicate with mobile stations scanning more channels than it scans itself, there is never any need for it to cause the repeater to transmit a collect signal of a longer duration than it would itself require. If it is necessary for a first mobile station to contact a second mobile station scanning more channels than does the first mobile station, the first mobile station may simply transmit a collect tone of a duration less than $\tau_{fixed}$ (since this automatically causes the repeater to regenerate the collect signal for a duration long enough to collect any mobile station supported by the system). Although more complex, it might be desirable to provide mobile stations with sufficient intelligence to produce a collect signal having a duration which is equal to that required by the mobile stations being called (e.g. by recognizing the called group and looking up the required collect tone duration in a table or the like). This scheme would optimize access time, but might only be justified if system configuration was unlikely to change and very short access time was critical.

Because the collect signal duration is not necessarily related to the type of signalling format (i.e. two-tone or four-tone) being used, even a mobile station using the two-tone signalling format may transmit a collect signal shorter than $\tau_{fixed}$. More particularly, a mobile station using a two-tone signalling format may transmit a collect signal having a duration less than the minimum collect signal duration corresponding to the number of channels it happens to itself scan. It is relatively easy to modify existing mobile stations so that they transmit a collect signal for a duration less than $\tau_{fixed}$ in systems wherein some but not all of the mobile stations supported by a repeater need to contact mobile stations requiring longer collect signal durations. If complete compatibility between all mobile stations is desired, then the fixed duration collect signal generation described in connection with FIG. 3 should be used instead of the collect signal generation described in connection with FIGS. 11 and 12.

An additional advantage results from using the signalling protocol shown in FIG. 11. It has been found that some older mobile stations of the two-tone type cannot reliably decode the busy signal transmitted by the repeater when signalling tones having frequencies close to the frequency of the busy signal are being transmitted by the repeater simultaneously. In the preferred embodiment, the busy signal comprises a sinusoidal audio tone having a relatively high frequency. Some of the group and sub-group signals used in the preferred embodiment have frequencies close to that of the busy signal in order to reduce bandwidth requirements.

As discussed previously, a calling mobile station using the signalling format shown in FIG. 1 listens for the busy signal immediately after transmitting its group and sub-group signals to ensure the channel has been dedicated to it (if the busy signal is not present at that time, the mobile station assumes the channel has not been dedicated to it and tries to access another channel).

If the repeater regenerates a collect signal and/or sub-group signal for a duration much longer than the duration of the collect signal transmitted by the mobile station (to provide compatibility with other mobile stations scanning many more channels than the calling mobile station), it is possible that the calling mobile station may look for the busy signal transmitted by the repeater while the repeater is still regenerating the collect signal or the subgroup signal. If the mobile station cannot detect the busy signal while the other signalling is being regenerated simultaneously, it may falsely assume the channel has not been dedicated to it, and move on to try to access another channel.

One way of avoiding this potential problem is to ensure that all mobile stations are capable of detecting the busy signal when the repeater is simultaneously regenerating group and sub-group signals with characteristics matching those transmitted by the mobile station. However, this potential problem is avoided entirely if, as described above, the mobile station specifies the duration of the collect signal transmitted by the repeater. This is because the mobile specifies the duration of the repeater's collect tone and the time the tones transmitted by the repeater terminate. Since the repeater tracks the mobile station's tones, the repeater will terminate the tones it is transmitting within 5 ms of the time the mobile station terminates its tones, so that only the busy signal will be present when the mobile station looks for it.

Of course, it might be desirable in certain other applications for the repeater to decide whether or not to "track" the mobile station collect tone at a time earlier than (or possibly later than) the end of the minimum collect tone duration necessary to collect a mobile station scanning a minimum number of channels. Moreover, it might be desirable for the mobile statin to specify the duration of tones transmitted by the repeater without requiring that the repeater-transmitted tones terminate at the same instant the mobile station tones terminate. For example, the repeater could exactly match the duration of the tones it transmits to the duration of the tones transmitted by the mobile station by extending its own transmitted tones by a duration $\tau_2$ (corresponding to the time needed by the repeater after the mobile station has begun transmitting its collect tone for the repeater to decode and then begin regenerating the collect tone) beyond the time the mobile station's collect tone terminates. In this way, the repeater still "tracks" the mobile station's transmitted tones, although the signals transmitted by the repeater are slightly skewed in time from those transmitted by the mobile station. Alternately, some applications might require the repeater to determine the duration of the tones it transmits according to a more complex function of the duration of the tones transmitted by the mobile station (e.g. multiplication and/or addition) than the identity function.

In the preferred embodiment, the repeater establishes a window of time for each of the signals it expects to receive from a mobile station. If a calling mobile station does not correctly follow signalling protocol (for instance, by transmitting signals of excessive or insufficient durations, transmitting some but not all of the signals required by the signalling protocol, transmitting signals in an incorrect sequence, etc.), the repeater does not dedicate the channel to the mobile station. However, when a mobile station in the preferred embodiment is denied access to a channel, it automatically scans to the next open channel in a predetermined sequence of channels and once again tries to obtain access to the repeater.

To discourage mobile stations transmitting invalid signalling protocol from constantly cycling through all available channels of the system and trying to access the available channels one after another, the repeater in the preferred embodiment does not immediately terminate signalling upon determining the mobile station's signalling protocol is invalid. Rather, it regenerates the mobile station's signalling, transmits the busy signal to "fool" the mobile station into believing a channel has been dedicated to it (and thus, prevents the mobile station from trying to gain access to another channel automatically), and then terminates all transmissions (thereby freeing the channel for dedication to a mobile station using valid signalling protocol).

If a mobile station transmits a very long collect signal, the repeater will attempt to track the mobile station's collect signal, thereby permitting even a mobile station using invalid signalling protocol to monopolize a channel (even though the repeater will terminate communications at the conclusion of signalling). To prevent such channel monopolization, the preferred embodiment may unconditionally terminate transmissions if the collect signal received from a mobile station is longer than the maximum collect tone duration necessary for any mobile station supported by the repeater.

It will thus be seen that there has been provided a new and improved control circuit and method for enabling the user of a mobile station to readily and quickly acquire a single unused radio frequency channel from a plurality of such channels for transmitting, or to be called on an available channel. The arrangement is relatively simple. Moreover, the arrangement is simultaneously compatible with two (or more) different signalling formats, thus permitting the use of a more advanced signalling format (which reduces the possibility of voice falsing and increases the number of groups capable of being served by the same system) to be used with existing equipment using a less advanced (i.e. two-tone) signalling format.

While there has been shown only a few exemplary embodiments of our invention, persons skilled in the art will appreciate that many modifications may be made. For example, a five channel system has been shown but there may be almost any number of channels and repeaters (however, good trunking practice limits the number of channels to about 20). Different logic circuit arrangements and logic levels may be used in place of the controller microprocessors of the preferred embodiment. Signal processing in the preferred embodiment is performed by an integrated circuit device (NEC 7720), but any signal processing arrangement (such as discrete amplifiers and filters, etc.) could be used instead. Signal processing need not be performed on digitized signals, but could instead be performed on the analog signals if desired.

While only a two-tone and a four-tone signalling sequence have been described, any number of tones may be used in the signalling sequence. Tone bursts in the signalling sequence need not be contiguous, but could be separated by time intervals if desired. If more accurate and expensive signal processing techniques are employed, the different signalling tone burst frequencies used could be increased in number to better eliminate falsing; indeed, the two-tone signalling sequence could use entirely different frequencies from those used by the four-tone signalling sequence. The repeater might, instead of measuring the rate of arrival of tone bursts over a specified time interval, measure the duration of tone bursts to distinguish between the exemplary two and four tone types of systems.

The arrangement disclosed may be used directly between mobile stations without the use of an intervening repeater, and the busy signal and acquisition signal may have almost any desired frequency or format. However, we believe it preferable that the busy signal be at a frequency just above the transmitted audio frequencies and that the signalling tone bursts be in the band transmitting the voice frequencies.

Therefore, while the invention has been described with reference to particular presently preferred exemplary embodiments, it is to be understood that many modifications may be made while retaining many of the novel advantages and features of the invention or from the scope of the appended claims.

What is claimed is:

1. In a trunking radio transceiver of the type which (a) in an idle mode scans plural channels to detect a pre-assigned calling sequence of N received signals S1–SN during respectively corresponding time periods T1–TN, (b) in a wait mode scans said plural channels to detect and acquire a non-used one of said channels, and (c) in a ready mode stays tuned to such detected calling-/acquired channel C and permits transceiver communications thereon, an improvement comprising:
   means for transmitting in said wait mode on said detected non-used channel C a calling sequence of M signals s1–sM during respectively corresponding time periods t1–tM which collectively occur during a time less than said T1 time period, said sequence s1–sM identifying at least one other called transceiver.

2. An improved trunking radio transceiver as in claim 1 further comprising:
   means for receiving and detecting on said channel C the presence of a signal S1 corresponding to s1 during a second portion of said T1 time period.

3. An improved trunking radio transceiver as in claim 2 further comprising:
   means for receiving and detecting on said channel C the presence of repeated signals S2–SM corresponding to s1–sM during time periods T2–TM so as to insure proper transmission of same to the called transceiver.

4. A trunking radio communications system comprising:
   a plurality of improved trunking radio transceiver as in any one of claims 1, 2 or 3; and
   a plurality of radio repeaters for repeating operations in said trunked radio communication system, said repeaters each comprising:
   receiver means for detecting the presence of a channel busy signal and of a sequence of P channel acquisition protocol signals s1–sP which may occur on the incoming side of a communications channel during corresponding time periods t1–tP; and
   transmitter means for regenerating and transmitting a corresponding sequence of P channel acquisition protocol signals s1–sP on the outgoing side of said communications channel during time periods T1–TP where T1 is greater than the combined duration of t1–TP.

5. A trunking radio communications system as in claim 4 further comprising a plurality of trunking radio transceivers of a second type which (a) in an idle mode scan plural channels to detect a preassigned calling sequence of Q received signals S'1–S'Q during respectively corresponding time periods T'1–T'Q (b) in a wait mode scan said plural channels to detect and acquire a non-used one of said channels, and (c) in a ready mode stay tuned to such detected calling or acquired channel C so as to permit transceiver communications thereon, where N is greater than Q and wherein each second type transceiver includes:

means for transmitting, in said wait mode on said channel C, a calling sequence of Q signals s1–sQ during Q successive time periods which are different than the successive time periods t1–tM employed for transmitting the calling sequence s1–SM originating from one of said improved transceivers.

6. A radio repeater for repeating operations in a trunked radio communication system, said repeater comprising:

receiver means for detecting the presence of a channel busy signal and of a sequence of P channel acquisition protocol signals s1–sP which may occur on the incoming side of a communications channel during corresponding time periods t1–tP; and transmitter means for regenerating and transmitting a corresponding sequence of P channel acquisition protocol signals s1–sP on the outgoing side of said communications channel during time periods T1–TP where T1 is greater than the combined duration of t1–tP.

7. A radio repeater as in claim 6 further comprising:

busy signal transmission means for also transmitting a predetermined busy signal on said outgoing side of said communications channel whenever the repeater is acquired for repeating functions and also suppressing such busy signal transmission during at least a portion of the time periods T1–TP when said channel acquisition protocol signals S1–SP are being transmitted on the outgoing side of said communications channel.

8. A system for establishing communication between a first radio transceiver and a second radio transceiver through a repeater and over a radio communication channel selected from a plurality of such communication channels, said system comprising:

(A) a first type of radio transceiver including
first channel locating means for locating an unused one of the radio channels; and
first transmitting means for transmitting a radio signal including a first type of called-transceiver identifying signal to a repeater on the unused channel located by the first channel locating means;

(B) a second type of radio transceiver including
second channel locating means for locating an unused one of the radio channels; and
second transmitting means for transmitting a radio signal including a second type of called-transceiver identifying signal to the repeater on the unused channel located by the second channel locating means; and (c) a repeater including
receiving means for receiving the radio signals transmitted by said first and second transmitting means;

third transmitting means for transmitting a busy signal upon receipt by said receiving means of radio signals transmitted by any of said first and said second transmitting means; and testing means for determining if a called-transceiver identifying signal received by said receiving means is of said second type, said third transmitting means temporarily interrupting the transmission of said busy signal if said testing means determines said second type of called-transceiver identifying signal has been received.

9. A system as in claim 8 wherein:
said first channel locating means includes means for scanning the radio communication channels and means for stopping the scanning on a channel not having a busy/ signal thereon;

said first transmitting means transmits a busy signal to the repeater over the channel on which the scanning is stopped;

said third transmitting means transmit an acquisition signal in response to the busy signal transmitted by the first transmitting means; and said first channel locating means restarts the scanning of said scanning means after said scanning has been stopped unless said third transmitting means transmits both said acquisition signal and an uninterrupted busy signal.

10. A system as in claim 9 wherein:
said second channel locating means includes means for scanning the communication channels and means for stopping the scanning on a channel not having a busy signal thereon;

said second transmitting means transmits a busy signal to the repeater operating on the channel on which the scanning has stopped;

said third transmitting means also transmits an acquisition signal in response to the busy signal transmitted by the second transmitting means; and said second channel locating means restarts the scanning of said scanning means unless said third transmitting means transmits said acquisition signal and/or regenerates signalling tones as originally sent by the second transmitting means.

11. A system as in claim 10 wherein:
said first type of called transceiver identifying signal comprises a first plurality of respective signalling tones; and said second type of called transceiver identifying signal comprises a second plurality of respective signalling tones, the number of tones in said second plurality of tones being different from the number of tones in said first plurality of tones.

12. A system as in claim 11 wherein:
each of the first plurality of tones is one of a plurality of predetermined frequencies; and each of said second plurality of tones is also one of the same plurality of predetermined frequencies.

13. A system as in claim 11 wherein:
at least one of said first plurality of tones has a duration different from the duration of the first of said second plurality of tones; and said third transmitting means includes means for determining the duration of at least one tone of a received one of the first and second type of called transceiver identifying signals.

14. A system as in claim 8 wherein:

said first type of called transceiver identifying signal includes a component having a first predetermined duration;

said second type of called transceiver identifying signal includes a component having a second predetermined duration different from said first predetermined duration; and said third transmitting means includes means for determining the duration of at least one of said components of a received one of said first and second type of called transceiver identifying signals.

15. A system as in claim 8 wherein:

said first and second channel locating means each include means for scanning the radio communication channels and means for stopping the scanning on a channel not having a busy signal thereon;

said second transmitting means transmits a busy signal to a repeater operating on the channel on which the scanning is stopped;

said third transmitting means also transmits an acquisition signal in response to the busy signal transmitted by said second transmitting means; and said second channel locating means restarts the scanning of said scanning means unless said third transmitting means transmits said acquisition signal.

16. A system for selectively dedicating a communication channel to one of a plurality of radio transceivers, said system comprising:

a first type of radio transceiver including at least first signalling means for producing a radio signal including a first type of called transceiver identifying signal;

a second type of radio transceiver including at least second signalling means for producing a radio signal including a second type of called transceiver identifying signal different from said first identifying signal;

at least one radio frequency communication channel for conveying information via radio signals; and channel dedicating means, selectively transmitting signals on said communication channel, for dedicating said communication channel to one of said first and said second type of radio transceivers, said dedicating means including means for applying a busy signal to said communication channel in response to radio signals transmitted by any of said first and second type radio transceiver, said channel dedicating means temporarily interrupting the application of said busy signal to said channel for a first predetermined time interval after applying said busy signal thereto in response to the occurrence of a second type of called transceiver identifying signal.

17. A system as in claim 16 wherein said channel dedicating means interrupts the application of said busy signal to said channel for a first predetermined time interval at a second predetermined time after said second type of called transceiver identifying signal is produced.

18. A system as in claim 16 wherein:

said first type of called transceiver identifying signal includes a plurality of components each of which include one of a plurality of predetermined frequencies; and said second type of called transceiver identifying signal includes a plurality of components each of which include one of the same plurality of predetermined frequencies.

19. A system as in claim 16 wherein said channel dedicating means further includes means for testing if said second type of identifying signal has occurred, said channel dedicating means conditioning the temporary interruption of the application of said busy signal on the outcome of the testing performed by said testing means 20. A method for selectively dedicating a communication channel to one of a plurality of type of radio transceivers, comprising the steps of:

selectively producing a radio signal modulated with a first type of called transceiver identifying signal different from said first type of identifying signal with a second type of radio transceiver;

selectively producing a radio signal modulated with a second type of called transceiver identifying signal different from said first type of identifying signal with a second type of radio transceiver;

applying a busy signal to a communication channel in response to radio signals transmitted by any first and second types of radio transceivers;

testing whether said second type of called-transceiver identifying signal has occurred; and after said applying step, temporarily interrupting the application of said busy signal to said channel for a predetermined time interval if said testing reveals said second type of called transceiver identifying signal has occurred.

21. A method for establishing communication between a first radio transceiver and a second radio transceiver through a repeater and over a radio channel selected from a plurality of such channels, said method comprising:

locating an unused one of the radio channels with a radio transceiver;

transmitting a called transceiver identifying signal having at least one predetermined characteristic parameter from the radio transceiver to a repeater over the located unused channel;

receiving transmissions of the radio transceiver at the repeater;

transmitting a busy signal from the repeater beginning at the time a transmission of the radio transceiver is received;

testing said received transmission to determine if it has said predetermined characteristic parameter at the repeater; and temporarily interrupting the transmission of said busy signal by the repeater beginning after said time of reception in response to the results of said test if such test reveals the received transmission has the predetermined characteristic parameter.

22. A method for communication between radio transceivers through a repeater and over a communication channel selected from a plurality of such channels, comprising the steps of:

searching for an unused channel;

transmitting from the repeater simultaneous busy and acquisition signal when said searching step locates an unused communication channel;

transmitting sequentially from a radio transceiver a series of signals each having a first predetermined duration and containing information identifying at least one other radio transceiver;

regenerating with said repeater the first of said signals simultaneously with said busy signal for a period on excess of said first predetermined duration, and thereafter successively regenerating the other of said signals without continuous occurrence of said busy signal;

receiving each of said regenerated signals with said radio transceiver; and re-initiating said busy signal transmission at a second predetermined time after regeneration of the last signal in said series, thereby indicating that said communication channel has been successfully acquired and dedicated.

23. A method for communication between radio transceivers through a repeater and over a communication channel selected from a plurality of such channels, said method comprising the steps of:

(1) searching for an unused channel with a radio transceiver;

(2) transmitting from the repeater simultaneous busy and acquisition signals on an unused communication channel located by said searching step (1);

(3) transmitting sequentially from the radio transceiver a plurality of signal tones containing information identifying at least one other radio transceiver;

(4) successively retransmitting said plurality of signal tones with said repeater;

(5) simultaneously with said retransmitting step (4), transmitting said busy signal with said repeater during at least the retransmitting of said first tone and temporarily ceasing to transmit said busy tone thereafter; and (6) re-starting said busy signal transmission a predetermined time after of the last signal tone is retransmitted by said retransmitting step (4).

24. A method as in claim 23 wherein:
said method further includes the steps of:
(a) decoding said tones retransmitted by said retransmitting step (4) with another radio transceiver,
(b) subsequently to said decoding step (a), determining with said other radio transceiver whether said busy signal is being transmitted by said repeater; and
(c) determining that said channel is not dedicated if said busy signal is determined by said determining step (b) not to be present; and wherein
said transmitt.ing step (5) includes the step of temporarily ceasing to transmit said busy signal beginning prior to completion of said determining step (b).

25. A method for communicating between radio transceivers through a repeater and over a communications channel, comprising the steps of:

(1) transmitting a collect signal from a radio transceiver for a duration predetermined by the radio transceiver;

(2) receiving said collect signal transmitted by said transmitting step (1) through a repeater;

(3) transmitting from a repeater a regenerated version of the collect signal received by said receiving step (2) for a controlled duration;

(4) determining at the repeater the duration of the signal transmitted by said transmitting step (1) in response to the collect signal received by said receiving step (2);

(5) controlling, at the repeater, the duration of the regenerated version of the collect signal transmitted by said transmitting step (3) to be a fixed predetermined duration if the duration determined by said determining step (4) is less than a first predetermined duration; and (6) controlling, at the repeater, the duration of the regenerated version of the collect signal transmitted by said transmitting step (3) to be approximately equal to the duration determined by said determining step (4) if said determined duration exceeds said first predetermined duration.

26. A method as in claim 25 wherein:
said transmitting step (1) includes the step of transmitting said collect signal at a first channel frequency;
said transmitting step (3) includes the step of transmitting said regenerated version of said collect signal at a second channel frequency different from said first frequency; and
said transmitting step (1), receiving step (2), transmitting step (3), and determining step (4) are all performed concurrently.

27. A method as in claim 25 wherein said fixed duration controlled by said controlling step (5) is of a second predetermined duration greater than said first predetermined duration.

28. A method as in claim 25 wherein:
said method further includes the step of periodically scanning, with another radio transceiver, a finite plurality of communication channels in a predetermined sequence the maximum scan time $\tau_{scan}$ required to scan said sequence once, $\tau_{scan}$ being substantially constant for each scan of said sequence; and said transmitting step (1) comprises the step of transmitting a collect signal identifying at least one other radio transceiver on one of said plurality of channels for a duration related to said maximum scan time $\tau_{scan}$.

29. A method as in claim 28 wherein said transmitting step (1) further includes the step of controlling the duration of said transmitted collect signal to be less than said first predetermined duration if said fixed duration controlled by said controlling step (5), is substantially greater than said maximum scan time $\tau_{scan}$, and otherwise controlling the duration of said transmitted collect signals to be equal to said maximum scan time $\tau_{scan}$.

30. A method as in claim 25 wherein said method further includes:

(a) scanning repeatedly with a second radio transceiver a first plurality n of communication channels, the maximum scan time $\tau_{scan2}$ required by said second radio transceiver to scan said first plurality of channels being substantially constant for each scan repetition and being directly proportional to n;

(b) scanning repeatedly with a third radio transceiver a second plurality m of communication channels, m being greater than n, the maximum scan time $\tau_{scan3}$ required to scan said second plurality of channels being substantially constant for each scan repetition and being directly proportional to m; and said transmitting step (1) includes the step of transmitting a collect signal identifying both of said second and third radio transceivers on a communication channel which is a member of both said first and second pluralities of channels for a duration related to the maximum scan $\tau_{scan3}$ of said third radio transceiver.

31. A method in claim 25 further including the steps of:

(a) subsequent to said transmitting step (1), transmitting at least one further called transceiver identifying signal from the radio transceiver;

(b) receiving said further called transceiver identifying signal transmitted by said transmitting step (a) with the repeater;

(c) subsequent to said transmitting step (3), transmitting regenerated version of the further called transceiver identifying signal received by said transmitting step (b);

(d) transmitting from the repeater a busy signal during said transmitting step (3);

(e) interrupting said busy signal transmission during at least a portion of said transmitting step (c); and (f) a predetermined time after said regenerated version of said further called transceiver identifying signal transmitted by said transmitting step (c) terminates once again, transmitting said busy signal with said repeater.

32. A method as in claim 31 wherein
said method further includes the step of decoding at another radio transceiver, in sequence and contiguously in time, the collect signal transmitted by said transmitting step (3), the further called transceiver identifying signal transmitted by said transmitting step (c), and the busy signal; and
said interrupting step (e) comprises the step of interrupting transmission of said busy signal before said decoding step completes decoding said busy signal.

33. A system for communicating between radio transceivers through a repeater over a communications channel, said system comprising:
at least one radio transceiver including means for transmitting a collect signal for a duration predetermined by the radio transceiver; and
a repeater including
means for receiving signals transmitted by said radio transceivers,
means for regenerating and transmitting versions of said received signals,
means for determining the duration of collect signals received by said receiving means, and
means for controlling the duration of transmitted regenerated versions of received collect signals to be a predetermined fixed duration if the duration determined by said determining means is less than a first predetermined duration and to be approximately equal to the duration determined by said determining means if said determined duration is at least equal to said first predetermined duration.

34. A system for establishing communication between a first radio station and a second radio station through a repeater and over a radio channel selected from a plurality of such channels, said system comprising:
(A) a first radio station including
first channel locating means for locating an unused one of the radio channels; and
first transmitting means for transmitting a first identifying signal to a repeater on the unused channel located by the first channel locating means;
(B) a second radio station including
a second channel locating means for locating an unused one of the radio channels; and
second transmitting means for transmitting a second identifying signal to the corresponding repeater on the unused channel located by the second channel locating means; and
(C) a repeater including:
receiving means for receiving the transmissions of said first second transmitting means; and
third transmitting means for transmitting a busy signal in response to the received transmission of any of said first and said second transmitting means, said third transmitting means interrupting the transmission of said busy signal in response to the received second identifying signal.

35. A system for selectively dedicating a communication channel to one of a plurality of sets of radio stations, said system comprising:
at least one communications channel for conveying radio signals;
a first radio station including at least first signalling means for applying to said communications channel a radio signal modulated with a first identifying signal;
a second radio station including at least second signalling means for applying to said communications channel a radio signal modulated with a second identifying signal different from said first identifying signal; and
channel dedicating means adapted for transmitting and receiving radio signals on said communication channel for dedicating said communication channel to one of said first and said second radio stations, said dedicating means including means for applying a busy signal to said communication channel in reponse to radio signals present on said communications channel, said channel edicating means temporarily interrupting the application of said busy signal to said channel for a first predetermined time interval in response to the second identifying signal.

36. A system for establishing communication between radio stations over a communication channel selected from a plurality of such channels, comprising:
means located at a first location for searching for an unused one of a plurality of channels;
means located at said first location and connected to said searching means for transmitting a sequence of signal tones of a first predetermined duration containing information identifying at least one other radio station;
transceiver means located at a second location remote to said first location for receiving said transmitted signal tones, for regenerating and retransmitting the first of said signal tones simultaneously with a busy signal for a period in excess of said first predetermined duration, and for thereafter regenerating and retransmitting the rest of said signal tones without said busy signal;
means located at said first location for receiving each of said regenerated, retransmitted signal tones;
means located at said first location and connected to said receiving and said transmitting means for comparing the signal tones transmitted by said first location transmitting means with the signal tones received by said first location receiving means; and
means located at said second location and connected to said transceiver means for re-initiating the transmission of said busy signal at a second predetermined time after regeneration of the last signal tone in said sequence.

37. A method for establishing communication between a first radio station and second radio station through a repeater and over a radio channel selected from a plurality of such channels, said method comprising:

locating an unused one of the radio channels with a first radio station;

transmitting a radio signal modulated with a first identifying signal with the first radio station to a repeater over the located unused channel;

receiving the radio signal transmitted by the first radio station with the repeater;

transmitting a busy signal with the repeater in response to said received radio signal;

testing at least one parameter of the received signal with the repeater;

temporarily ceasing to transmit said busy signal with the repeater for a finite time period in response to the results of said test; and resuming transmission of said busy signal by said repeater after said finite time period has elapsed so long as said transmitted radio signal is still being received by said repeater.

38. A method for communication between radio stations through a repeater and over a communication channel selected from a plurality of such channels, comprising the steps of:

transmitting from a radio station over an unused communications channel, a sequence of signal tones each having a first predetermined duration, said sequence of signal tones containing information identifying at least one other radio station;

receiving said plurality of transmitted signal tones with a repeater;

regenerating and transmitting with said repeater the first of said plurality of transmitted signal tones simultaneously with a busy signal for a period in excess of said first predetermined duration, and for thereafter regenerating and transmitting the rest of said plurality of transmitted signal tones without said busy signal;

receiving each of said regenerated, transmitted signal tones with said radio station;

comparing the signal tones transmitted and received by said radio station; and initiating transmission of said busy signal with said repeater at a second predetermined time after regeneration of the last signal tone in said sequence if the transmitted and received signal tones match, thereby indicating to the radio station that said communication channel has been dedicated for its use.

39. A system for establishing communication between radio transceivers through a repeater and over a communication channel selected from a plurality of such channels, said system comprising:

means included in a radio transceiver for locating an unused one of a plurality of channels and for requesting use of said located unused channel;

means included in a repeater for transmitting simultaneous busy and acquisition signals in response to said request for channel use;

means included in said radio transceiver for successively transmitting a plurality of signals of first predetermined durations containing information identifying at least one other radio transceiver;

means included in said repeater for receiving said transmitted signals and for regenerating the first of said signals simultaneously with said busy signal for a period in excess of its duration of receipt and thereafter further regenerating the other of said successive signals while suppressing transmission of said busy signal during at least a portion of such further regeneration;

means included in said radio transceiver for receiving each of said regenerated signals;

means included in said transceiver for comparing the signals transmitted by said radio transceiver with the signals received by said radio transceiver; and means included in said repeater for initiating the transmission of said busy signal at a second predetermined time after regeneration of the last signal in said succession.

* * * * *